US007171294B2

(12) United States Patent
Kindo et al.

(10) Patent No.: US 7,171,294 B2
(45) Date of Patent: Jan. 30, 2007

(54) ON-VEHICLE VIDEO PLAYBACK SYSTEM AND CAR NAVIGATION DEVICE

(75) Inventors: Tsuyoshi Kindo, Sennan-gun (JP); Akihiro Suzuki, Itami (JP); Yorihiko Wakayama, Ibaraki (JP); Tomoyoshi Nagawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 262 days.

(21) Appl. No.: 10/836,252

(22) Filed: May 3, 2004

(65) Prior Publication Data

US 2004/0225425 A1 Nov. 11, 2004

(30) Foreign Application Priority Data

May 9, 2003 (JP) ............................. 2003-132319

(51) Int. Cl.
*G06F 19/00* (2006.01)

(52) U.S. Cl. ............................ 701/36; 701/1; 348/148

(58) Field of Classification Search ..................... None
See application file for complete search history.

(56) References Cited

U.S. PATENT DOCUMENTS

| | | | | |
|---|---|---|---|---|
| 5,266,922 | A | 11/1993 | Smith et al. | |
| 6,029,110 | A * | 2/2000 | Zuber et al. | 701/200 |
| 6,385,772 | B1 * | 5/2002 | Courtney | 725/105 |
| 6,400,265 | B1 * | 6/2002 | Saylor et al. | 340/531 |
| 6,424,888 | B1 * | 7/2002 | Sone et al. | 701/1 |
| 6,501,391 | B1 * | 12/2002 | Racunas, Jr. | 340/932.2 |
| 6,542,077 | B1 * | 4/2003 | Joao | 340/426.16 |
| 6,574,531 | B1 * | 6/2003 | Tan et al. | 701/1 |
| 6,697,103 | B1 * | 2/2004 | Fernandez et al. | 348/143 |
| 6,717,287 | B1 * | 4/2004 | Tengler et al. | 307/10.1 |
| 2002/0070852 | A1 * | 6/2002 | Trauner et al. | 340/438 |
| 2002/0152115 | A1 | 10/2002 | Morita et al. | |
| 2003/0023874 | A1 | 1/2003 | Prokupets et al. | |

FOREIGN PATENT DOCUMENTS

| | | |
|---|---|---|
| JP | 2000-036088 | 2/2000 |
| JP | 2002-057935 | 2/2002 |
| JP | 2002-107158 | 4/2002 |

* cited by examiner

*Primary Examiner*—Michael J. Zanelli
(74) *Attorney, Agent, or Firm*—Wenderoth, Lind & Ponack, L.L.P.

(57) ABSTRACT

An on-vehicle device, which is connected to an external image taking device via the Internet so as to allow communication therebetween, includes a communication section, a reception notification section, a display section, a vehicle stopped state detection section, and a display control section. When the communication section receives an emergency (or call) detection notification from the image taking device, the display control section checks the vehicle stopped state detection section to determine whether or not a vehicle is stopped. If the vehicle is stopped, the display control section receives video data from the image taking device via the communication section for causing the display section to display a video image of the video data. Otherwise, the display control section notifies a user of an emergency (or call) detection notification via the reception notification section.

11 Claims, 16 Drawing Sheets

ON-VEHICLE VIDEO PLAYBACK SYSTEM AND CAR NAVIGATION DEVICE

BACKGROUND OF THE INVENTION

1. Field of the Invention

The present invention relates to an on-vehicle camera image playback device and a car navigation device for receiving a video image (a still image or a moving image), which is to be viewed by a driver in a vehicle, from a network camera (a Web camera) for playback.

2. Description of the Background Art

In recent years, more and more people view video images, which are captured by a network camera, using a device (e.g., a PC and a mobile phone) capable of playing back a camera image at remote locations via the Internet for various purposes, for example, as a surveillance camera.

For example, in a conventional technique shown in FIG. 14, a network camera 511 placed in a house (home) is connected to an Internet network via an ADSL (Asymmetric Digital Subscriber Line) modem 513 and a broadband router 512 in a broadband environment such as an ADSL. The network camera 511 has a camera section (not shown) for capturing video images, and a digital processing section (not shown) which performs a digital process for the captured video images, and transmits the processed video images to a network side. By specifying an IP (Internet Protocol) address of the network camera 511, a mobile phone 514 and a PC 515 at remote locations are able to display video images captured by the network camera 511 using a browser, as long as the mobile phone 514 and the PC 515 are connected to the Internet wherever they are. The IP address is assigned by an Internet provider. As a result, the network camera 511 can be used as a surveillance camera. Also, the network camera 511 may be placed both inside and outside a building, whereby the goings-on within a house can be monitored, a lecture or a lesson can be distributed, parents are allowed to view what their child is doing in kindergarten or a child-care center, or a landscape of a leisure venue or traffic jam information, etc., can be viewed. The number of network cameras used for the above-described purposes is increasing, and therefore, more and more people will view the video images captured by the network camera in a vehicle.

As a combination of the above-described network camera and a sensor for detecting an emergency such as a break-in, fire, or gas leak, for example, there exists a portable security system disclosed in Japanese Patent Laid-Open Publication No. 2000-36088. In this portable security system, as shown in FIG. 15, a user, who is a resident of a house, has a mobile phone 615 as a portable information device. When a sensor 613 detects an emergency, the user away from home is notified of detection of the emergency by means of the mobile phone 615 via a wireless transceiver 612 (see arrows 1*a* and 1*b*). The user uses the mobile phone 615 to operate a camera with a microphone 611 (see arrows 2*a* and 2*b*) via the wireless transceiver 612, and receives video and audio from the camera with the microphone 611 for playback, thereby viewing what is going on in his/her house (see arrows 2*c* and 2*d*). If something goes wrong in the house, the user can control a security alarm 614 so as to be activated by using the mobile phone 615 (see arrows 3*a* and 3*b*). Also, the user can stop the security alarm 614 when the emergency is over. Alternatively, after the wireless transceiver 612 receives a signal from the sensor 613, the security alarm 614 can be activated (without the user's operation) immediately after the signal is transmitted thereto (see arrow 1*c*).

With the above-described portable security system using a conventional technique, when something goes wrong in the house, the user can handle the emergency by himself/herself by operating the mobile phone without relying on a security company. Also, in order to view what is going on in the house, the user can use the mobile phone 615 as a remote controller for the camera with the microphone 611 while checking video and audio, thereby remotely operating an orientation or a magnifying power of the camera (as for a method of controlling the camera using the mobile phone, also see Japanese Patent Laid-Open Publication No. 2002-57935).

However, the above-described conventional techniques are not designed to be used in a vehicle.

On the other hand, there exist an on-vehicle video mail storage/playback device and a car navigation device disclosed in Japanese Patent Laid-Open Publication No. 2002-107158, for example, which are designed to be used in a vehicle. FIG. 16 is a block diagram showing a car navigation device 71 capable of storing and playing back video mail, which is disclosed in Japanese Patent Laid-Open Publication No. 2002-107158.

In FIG. 16, a GPS receiver 723 is able to detect a current position of a vehicle on which it is mounted, a vehicle speed sensor 724 is able to detect a vehicle speed, and a G sensor 725 is able to detect acceleration exerted on the vehicle. Also, a signal processing device 716 processes input signals from the GPS receiver 723, the vehicle speed sensor 724, and the G sensor 725, and outputs a current position signal, a vehicle speed signal, and an acceleration signal. A memory 713 stores moving image data read from video mail to be transmitted/received, or from an external recording medium 721. A moving image data reading section 715 reads moving image data from the external recording medium 721 (for example, a memory card). A communication control section 712 is an interface for controlling a mobile phone 72 to establish exchange of communication data. A rendering LSI 714 is a circuit for converting video mail to be transmitted/received to rendering data, thereby causing a display monitor 720, which is placed inside the vehicle, to display the video mail. Note that the display monitor 720 is placed on a vehicle dashboard near a driver. A current position calculating section 718, which is connected to a CPU 711, calculates a current position based on the current position signal from the GPS receiver 723, and a route search section 719 searches for an optimal route from the calculated current position to a destination point or an intermediate point, which is input by the user. The current position calculating section 718 and the route search section 719 are realized by a program. A DVD-ROM drive 717 is a cartographic data reading section for reading cartographic data from a DVD-ROM 722 in which the cartographic data is stored.

In the car navigation device 71 structured as described above, the CPU 711 determines whether or not the vehicle is stopped based on the vehicle speed signal from the vehicle speed sensor 724 or the acceleration signal from the G sensor 725. The CPU 711 causes the display monitor 720 to display the received video mail after reading it from the memory 713 only when the CPU 711 determines that the vehicle is stopped. As such, the received video mail is not displayed while the vehicle is traveling in order to prevent the driver from losing concentration while driving, thereby ensuring safety.

The techniques disclosed in Japanese Patent Laid-Open Publication No. 2000-36088 and Japanese Patent Laid-Open Publication No. 2002-57935 undeniably present a safety hazard because the user has to operate buttons of a portable device (e.g., a mobile phone or a PHS) while watching a small display monitor thereof at frequent intervals in order to view camera images and adjust an orientation of the camera, thereby being prevented from concentrating on driving. Thus, it is necessary to revise the above-described techniques so that the driver can use them in the vehicle safely and conveniently.

On the other hand, the car navigation device disclosed in Japanese Patent Laid-Open Publication No. 2002-107158, whose target user is a driver in the vehicle, performs playback of video mail only when the vehicle is stopped for safety's sake. As a result, the user is not allowed to view the video mail for checking the content thereof in the traveling vehicle. This does not really matter in the case of video mail which often includes less urgent information. However, it is a significant disadvantage if the user is not allowed to view information which is important or urgent while he/she is driving. For example, in the case where video data of a network camera used for the purpose of security is received, the user has to check a video image of the video data in real time. However, the user is not allowed to check it in real time while he/she is driving a vehicle. As a result, this is a real disadvantage if the user has to drive for a long time without a stop (e.g., the user has to drive for a long time until the next stop when he/she travels along an expressway).

Thus, there is a need for an on-vehicle network camera image playback device which is capable of solving a problem of a trade-off between safety and convenience.

SUMMARY OF THE INVENTION

Therefore, an object of the present invention is to provide an on-vehicle video playback system and a car navigation device allowing a user, if necessary, to view a video image safely even if he/she is driving a vehicle in the case where a video image from an external image taking device is displayed inside the vehicle.

The present invention has the following features to attain the object mentioned above.

An on-vehicle device of the present invention is placed in a vehicle and connected to an external image taking device so as to allow communication therebetween via the internet. The external image taking device has a function of detecting an emergency at least within an area in which an image is captured and a call, and a function of transmitting an emergency detection notification or a call detection notification to a previously designated destination via the Internet when an emergency or a call is detected. The on-vehicle device of the preset invention comprises a communication section, a reception notification section, a display section, a vehicle's stopped state detection section, and a display control section. The communication section communicates with the image taking device via the Internet. When the communication section receives an emergency detection notification or a call detection notification from the image taking device, the reception notification section notifies a user of reception. At that time, the display control section checks the vehicle's stopped state detection section to determine whether or not the vehicle is stopped. If the vehicle is stopped, the display control section obtains video data from the image taking device via the communication section, and causes the display section to display a video image of the video data. On the other hand, if the vehicle is not stopped, the display control section only notifies the user of an emergency detection notification or a call detection notification by the reception notification section.

In a preferable embodiment of the on-vehicle device of the present invention, the reception notification section performs reception notification by the blinking of a button, a sound, vibration, displaying a character or a symbol on a display panel, or an arbitrary combination thereof.

In the preferable embodiment of the on-vehicle device of the present invention, the on-vehicle device further comprises a video image playback instruction input section for accepting an input of a video image playback instruction from the user. If the vehicle is not stopped, the control section receives video data from the image taking device via the communication section at least when a video image playback instruction is input from the video image playback instruction input section, and causes the display section to display a video image of the video data.

In the preferable embodiment of the on-vehicle device of the present invention, when the image taking device detects an emergency or a call, an emergency detection notification is transmitted. The emergency detection notification transmitted when the external image taking device detects an emergency may be various types of signals. For example, a video image playback request signal and an emergency (or call) detection signal can be taken as a typical example. In the former case, the display control section performs a display control operation in response to reception of a video image playback request signal. In the latter case, the display control section performs a display control operation in response to reception of an emergency (or call) detection signal.

In the preferable embodiment of the on-vehicle device of the present invention, in the case where the vehicle is not stopped when the communication section receives an emergency detection notification from the image taking device, the display control section obtains video data from the image taking device and causes the display section to display a video image of the video data if a video image playback instruction is input from the video image playback instruction input section within a predetermined time period after the reception notification section notifies the user of reception of emergency detection. Note that a video data storing section may be additionally provided for storing the video data obtained from the image taking device in the video data storing section if a video image playback instruction is not input within a predetermined time period. Preferably, when the vehicle is stopped, the display control section reads the video data stored in the video data storing section, and causes the display section to display a video image of the video data.

As such, in the case where the user does not view a video image from the image taking device while he/she is driving a vehicle, the user is not required to input a video image playback instruction within a predetermined time period after a reception is notified by the reception notification section. In this case, the display control section receives video data from the image taking device, and causes the video data storing section to store the received data, whereby it is possible to cause the display section to display a video image of the video data whenever the user desires to view it (for example, after the vehicle is stopped).

In another preferable embodiment of the on-vehicle device of the present invention, the video image playback instruction input section is a button, a key, a touch panel, a speech recognition device, a remote control device, or an arbitrary combination thereof.

In another preferable embodiment of the on-vehicle device of the present invention, the reception notification section performs reception notification by the blinking of a button, and the video image playback instruction input section inputs a video image playback instruction when the blinking button is depressed.

In another preferable embodiment of the on-vehicle device of the present invention, the communication section includes a mobile phone terminal and a wireless LAN transmitting/receiving section, the mobile phone terminal is used for receiving an emergency detection notification or a call detection notification from the image taking device, and the wireless LAN transmitting/receiving section is used for receiving video data from the image taking device.

The present invention is also directed to a remote monitoring system, in which an on-vehicle device placed in a vehicle and an external image taking device are connected via the Internet so as to allow communication therebetween. In the remote monitoring system, the image taking device includes an emergency detecting sensor or a call detecting sensor for detecting an emergency at least within an area in which an image is captured or a call, and a transmitting section for transmitting an emergency detection notification or a call detection notification to a previously designated destination via the Internet when the emergency detecting sensor or the call detecting sensor detects an emergency or a call. On the other hand, the on-vehicle device includes: a communication section, a reception notification section, a display section, a vehicle's stopped state detection section, a video image playback instruction input section, and a display control section. The communication section performs communication with the image taking device via the Internet. When the communication section receives an emergency detection notification or a call detection notification from the image taking device, the reception notification section notifies a user of reception. At that time, the display control section checks the vehicle's stopped state detection section to determine whether or not the vehicle is stopped. If the vehicle is stopped, the display control section obtains video data from the image taking device via the communication section, and causes the display section to display a video image of the video data. On the other hand, if the vehicle is not stopped, the display control section obtains video data from the image taking device, and causes the display section to display a video image of the video data when at least a video image playback instruction is input from the video image playback instruction input section.

Based on the on-vehicle device of the present invention, a user in the vehicle can view a video image of an emergency from the image taking device in real time when a vehicle is stopped. Also, even if the vehicle is traveling, the user can view the video image of the emergency in real time if he/she desires to do so (by inputting a video image playback instruction within a predetermined time period, for example). Thus, the user can handle the emergency as speedily as possible.

Based on the on-vehicle device of the present invention, reception notification of an emergency notification or a call detection notification is performed by the blinking of a button, a sound, vibration, displaying a character or a symbol on a display panel, or an arbitrary combination thereof, whereby it is possible to notify the user driving the vehicle of reception of the emergency detection notification or the call detection notification in an appropriate manner.

Also, an input of the video image playback instruction is performed using the above-described reception notification button, whereby it is possible to easily perform reception notification and video image playback instruction using the same means. As such, even if the user is driving the vehicle, he/she can easily input a video image playback instruction with minimum risk.

Further, a video image which is not viewed by the user driving the vehicle is stored in the storing section, whereby the user can check the video image later. Thus, the user can avoid missing the video image captured at the time of an emergency or a call.

Also, based on the on-vehicle device of the present invention, transmission and reception of large volumes of data such as video data can be performed by a wireless LAN, whereby it is possible to display a high quality image due to a communication speed of the wireless LAN which is faster than a mobile phone. Further, large volumes of video data can be received from the image taking device using the wireless LAN. As a result, a communication band of a mobile phone line is not restricted, which is an advantage.

Based on the remote monitoring system of the present invention, for example, it is possible to safely notify a user in a vehicle at remote locations of an accident or an emergency happening in his/her house in real time.

Based on the on-vehicle device of the present invention, it is possible to safely notify a user driving a vehicle of an emergency or a call at remote locations in real time. Thus, the present invention is useful as a camera image playback device, for example, used by a driver in a vehicle safely and conveniently.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First Embodiment

Figure 1:
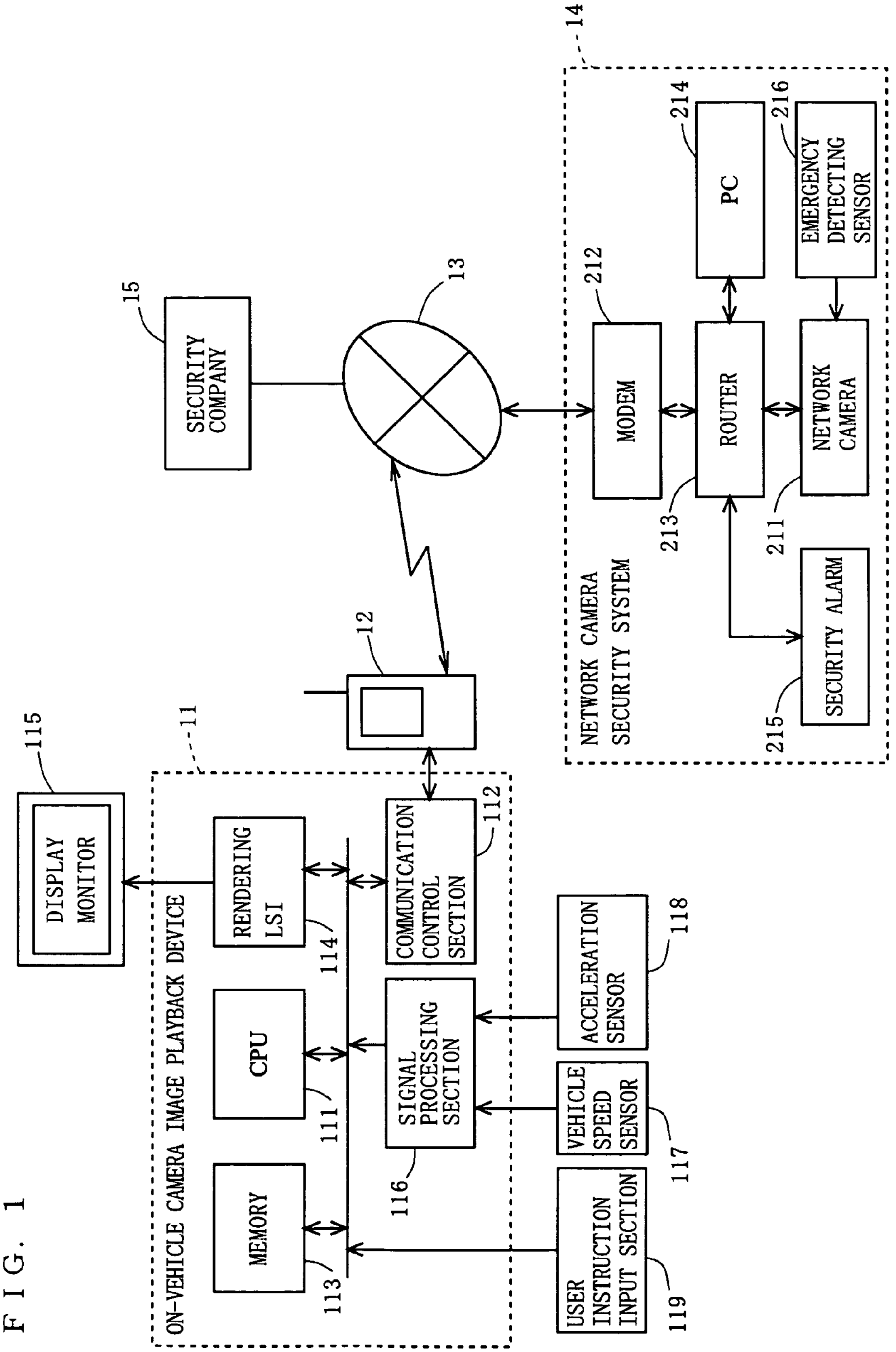
FIG. 1 is a block diagram showing an on-vehicle network camera image playback system including an on-vehicle camera image playback device 11 and a network camera security system 14 according to a first embodiment of the present invention.

FIG. 1 is a block diagram showing an on-vehicle network camera image playback system including an on-vehicle camera image playback device 11 and a network camera security system 14 according to a first embodiment of the present invention.

First, the on-vehicle camera image playback device 11 will be described. The on-vehicle camera image playback device 11 includes a CPU 111, a communication control section 112, a memory 113, a rendering LSI 114, a display monitor 115, and a signal processing section 116.

The communication control section 112 is an interface used for transmission and reception of communication data with an Internet network 13. The communication control section 112 controls a communication terminal 12 connected thereto. The communication terminal 12, which is a terminal device for connecting the on-vehicle camera image playback device 11 and a network camera 211 via the Internet network 13, transmits/receives a control signal or video data, etc., to/from the network camera 211. Further, the communication terminal 12 connects the on-vehicle camera image playback device 11 and a security company 15 via the Internet network 13. The communication terminal 12 is, for example, a device installed with a wireless communication function, which is any one or a combination of a mobile phone, a PDA (Personal Digital Assistant), a PHS, a wireless LAN transmitting/receiving section, and a DSRC (Dedicated Short Range communication) transmitting/receiving section, etc. Needless to add, it is possible to use an original function of the communication terminal 12, for example, as a mobile phone or a PDA.

The rendering LSI 114 converts video data received by the communication control section 112 and the communication terminal 12 to rendering data, and sends the converted data to the display monitor 115. The memory 113 stores the video data received by the communication terminal 12 and the communication control section 112 from the network camera. Note that the received video data is not necessarily stored in the memory 113, and it can be displayed by the display monitor 115 immediately after it is received by the communication terminal 12 and the communication control section 112. The display monitor 115 displays the video data, which is converted by the rendering LSI 114 to the rendering data. Note that, in the case where a mobile phone installed with a function of displaying a video image captured by the network camera is used as the communication terminal 12, the on-vehicle camera image playback device 11 may deactivate the mobile phone's function of displaying a camera image when it is detected that such a mobile phone is connected to the on-vehicle camera image playback device 11 (not shown). Thus, it is possible to prevent the user from viewing the camera image using the mobile phone, which often requires the user to pay attention thereto. The above-described control of the mobile phone can be performed by the communication control section 112.

The signal processing section 116 is connected to the vehicle speed sensor 117 and the acceleration sensor 118, and processes an input signal from these sensors for outputting a vehicle speed signal and an acceleration signal, etc., to the CPU 111. The vehicle speed sensor 117 generates a pulse in accordance with the number of revolutions of a wheel, and detects a vehicle speed by counting the number of pulses. The acceleration sensor 118 detects acceleration exerted on the vehicle, and detects a vehicle speed by detecting acceleration, speed reduction, and a stop of the vehicle, and integrating the detected acceleration.

The user instruction input section 119 is a device used by the user for inputting a camera image playback instruction, and a request for the security company 15 to rush immediately to a site (or an emergency call request). In order to issue a camera image playback instruction and an emergency call request, which will be described below, the user may issue such instructions by voice, a remote controller, an operation of buttons or keys, and an operation of a touch panel. Thus, a speech recognition device, a device capable of detecting an instruction from a remote controller (e.g., an infrared sensor), a device having buttons or keys, or a touch panel, etc., can be used as the user instruction input device 119. When a camera image playback instruction is received from the user, the user instruction input device 119 transmits a camera image playback instruction signal to the CPU 111.

The CPU 111 controls the on-vehicle camera image playback device, and performs the following operations, for example: determining whether or not data received via the communication terminal 12 and the communication control section 112 is sent from the network camera, determining whether or not the vehicle is stopped based on information output from the signal processing section 116, and determining the presence or absence of a playback instruction from the user, or the presence or absence of an emergency call request.

The security company 15 is ready to accept a request provided by the user, and sends a staff person to the site immediately after the request is accepted. The security company 15 manages a signal assigned to a request provided by the user as being combined with a location at which the network camera 211 (or an emergency detecting sensor 216) is placed, thereby identifying the user and the site in which an emergency has happened. Note that the security company 15 may be connected to the network camera 211 via the Internet network 13.

Next, the network camera security system 14 will be described. In FIG. 1, the network camera security system 14 includes the network camera 211, a modem 212, a router 213, a PC (personal computer) 214, a security alarm 215, and an emergency detecting sensor 216. The network camera security system 14 can be placed in an arbitrary site where this system is needed for the purpose of security, such as a house (home), an office building, school, and a child-care center.

The emergency detecting sensor 216 detects an emergency such as a break-in, fire, or gas leak, for example. Such a sensor includes a magnet sensor, an infrared heat detecting sensor for detecting a body heat, a shock sensor, a gas leak detecting sensor, a heat detecting sensor for detecting fire, and a smoke detecting sensor. When an emergency is detected, the emergency detecting sensor 216 transmits an emergency detection signal to the network camera 211. When the above-mentioned emergency is detected, the network camera 211 captures an image of a scene of the site. As the network camera 211, for example, a digital still camera, a digital video camera, a CCD camera, a video camera, and an infrared camera can be used. The network camera 211 is connected to the Internet network 13 via the modem 212 and the router 213, and is provided with IP (Internet protocol)—compliant specifications so that communication by the Internet is possible. Also, the network camera 211 may be installed with, for example, the following functions: a function (not shown) for changing a camera orientation by receiving a control signal from the on-vehicle camera image playback device 11, and a function (not shown) for detecting an image of a person and automatically changing an orientation of a camera to track the person.

Note that the emergency detecting sensor 216 can be replaced with other emergency notifying device (not shown) such as a so-called "panic button (or call button)". The panic button is a button or a switch which is electrically connected to an automatic signal transmitting device for automatically transmitting a signal. The automatic signal transmitting device transmits a signal indicating an emergency such as a break-in, fire, or a sudden illness to a predetermined transmission destination, and notifies a person in the transmission destination of the emergency.

The security alarm 215 is activated in accordance with an operation from the on-vehicle camera image playback device 11. Alternatively, if necessary, the security alarm 215 may be automatically activated when the emergency detecting sensor 216 detects an emergency. The security alarm 215 includes a burglar alarm, an emergency bell, an alarm, and a security light, and so on. The security alarm 215 is connected to the Internet network 13 via the modem 212 and the router 213, and is compliant with IP so as to perform Internet communication with the on-vehicle camera image playback device 11. The PC 214 performs not only its original function but also network-related settings for the network camera 211 and the security alarm 215.

Note that, in FIG. 1, the communication terminal 12, the display monitor 115, the vehicle speed sensor 117, the acceleration sensor 118, and the user instruction input section 119 are shown as external elements attached to the on-vehicle camera image playback device 11, but the above elements may be built into the on-vehicle camera image playback device 11.

Figure 2:
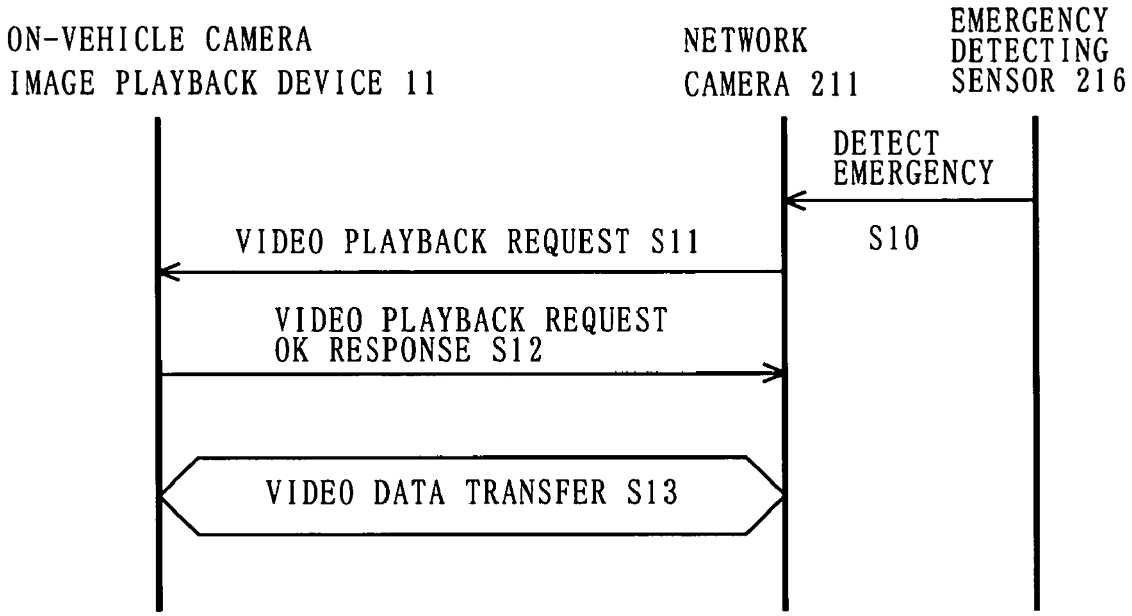
FIG. 2 is a sequence diagram showing a flow of a control signal and video data, which are transmitted and received between the on-vehicle camera image playback device 11, a network camera 211, and an emergency detecting sensor 216 shown in FIG. 1.

FIG. 2 is a sequence diagram showing a flow of a control signal and video data, which are transmitted and received between the on-vehicle camera image playback device 11, the network camera 211, and the emergency detecting sensor 216.

As shown in FIG. 2, when an emergency (or a call) is detected, the emergency (or call) detecting sensor 216 transmits an emergency (or call) detection signal to the network camera 211 (step S10). When the emergency (or call) detection signal is received, the network camera 211 transmits a video playback request signal to the on-vehicle camera image playback device 11 (step S11). When the signal is received, the on-vehicle camera image playback device 11 sends back a video playback request response OK signal to the network camera 211 based on whether or not the vehicle is stopped and on the presence or absence of a playback instruction from the user (step S12). When the video playback request response OK signal is received, the network camera 211 transmits video data to the on-vehicle camera image playback device 11 (step S13). A video image of the transmitted video data is displayed on the display monitor 115 of the on-vehicle camera image playback device 11, whereby the user can view what is going on in the house by a video image (a moving image).

Figure 3:
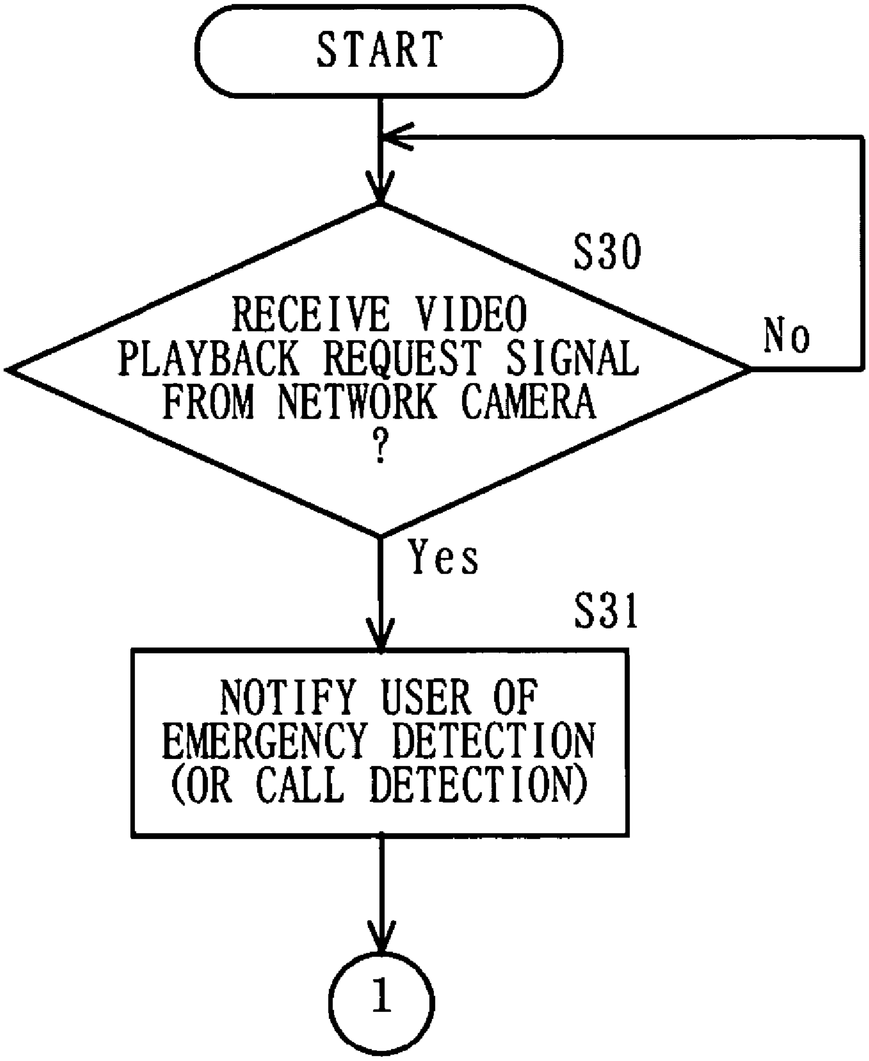
FIG. 3 is a flow diagram showing a process performed by a CPU 111 of the on-vehicle camera image playback device 11 for notifying a user of an emergency (or a call) in the embodiment of the present invention shown in FIGS. 1 and 2.

FIG. 3 is a flow diagram showing a process performed by the CPU 111 of the on-vehicle camera image playback device 11 for notifying a user of an emergency (or a call) in the embodiment of the present invention shown in FIGS. 1 and 2. Hereinafter, with reference to FIG. 3, the process performed by the CPU 111 will be described.

The operation of the CPU 111 shown in FIG. 3 is started when the on-vehicle camera image playback device 11 is turned ON. First, the CPU 111 determines whether or not the on-vehicle camera image playback device 11 receives a video playback request signal from the network camera 211 via the communication terminal 12 and the communication control section 112 (step S30). If the on-vehicle camera image playback device 11 does not receive the signal (NO in step S30), the CPU 111 repeats the process in step S30. If the on-vehicle camera image playback device 11 receives the signal (YES in step S30), the CPU 111 notifies the user of emergency (or call) detection (step S31). Here, reception notification for the user in step S31 is performed, for example, by giving the user the following warnings: a text message on a display panel, the blinking of a flashing button (see FIG. 11, for example), a sound, and vibration, or any combination thereof, such that the user can notice the notification from the CPU 111 using his/her five senses.

Figure 4:
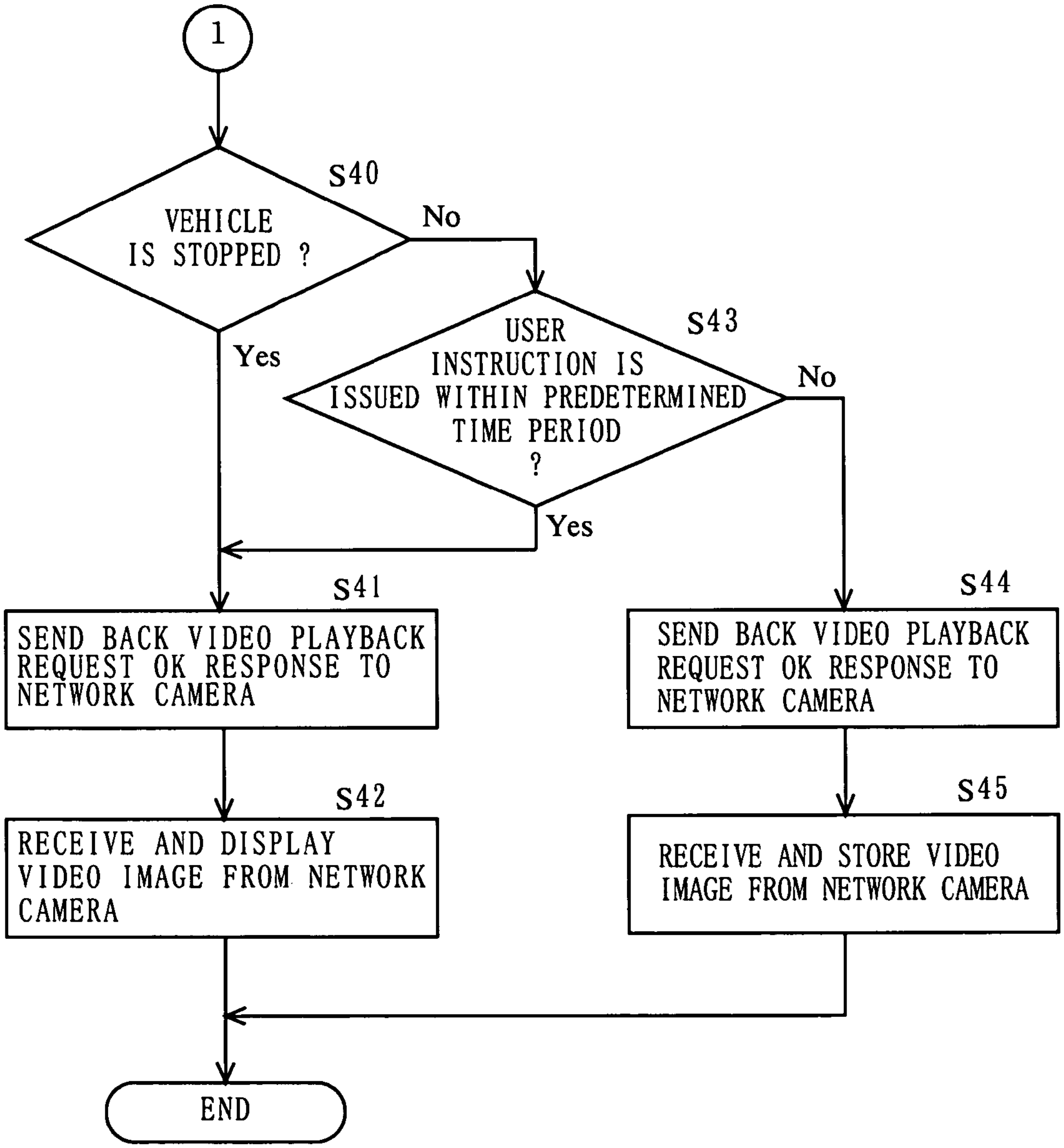
FIG. 4 is a flow diagram showing a camera image playback control process performed by the CPU 111 of the on-vehicle camera image playback device 11 in the embodiment of the present invention shown in FIGS. 1 and 2.

After notifying the user of emergency (or call) detection, the CPU 111 proceeds to a camera image playback control process. FIG. 4 is a flow diagram showing the camera image playback control process performed by the CPU 111 of the on-vehicle camera image playback device 11 in the embodiment of the present invention shown in FIGS. 1 and 2.

Hereinafter, with reference to FIG. 4, a camera image playback control process by the CPU 111 will be described.

The CPU 111 first notifies the user of reception (FIG. 3), and determines whether or not the vehicle is stopped based on a signal output from the signal processing section 116 (step S40). If the vehicle is stopped (YES in step S40), the CPU 111 sends back a video playback request OK response signal to the network camera 211 (step S41). Next, when the on-vehicle camera image playback device 11 receives video data from the network camera 211 via the communication term in a 112 and the communication control section 112, the CPU 111 causes the display monitor 115 to display a video image of the received video data (step S42). Also, the CPU 111 may store the received video data in the memory 113 in step S42 (not shown in FIG. 4) when or after a video image of the received video data is displayed on the display monitor 115. Thus, in the case where the user desires to check the video image later, he/she can play back the video data stored in the memory 113.

On the other hand, if the vehicle is not stopped in step S40 (NO in step S40), the CPU 111 determines whether or not a playback instruction is issued by the user within a predetermined time period after reception of the video playback request signal is notified (FIG. 3) (step S43). If the playback instruction is issued by the user (YES in step S43), as is the case where the vehicle is stopped, the CPU 111 transmits a video playback request OK response signal to the network camera 211 (step S41). Next, when video data transmitted from the network camera 211 is received via the communication terminal 12 and the communication control section 112, the CPU 111 causes the display monitor 115 to display a video image of the received data (step S42). Note that a "predetermined time period" may be an arbitrary time length, but it corresponds to a time period equal to or longer than a time period usually required for the user to issue a playback instruction after he/she notices a reception notification in FIG. 3. Thus, in general, a predetermined time period is a time period from a few seconds to a few minutes, and in the more general sense, a few seconds to several tens of seconds. The "predetermined time period" may be previously fixed by the device, or may be arbitrarily set by the user. Also, a "playback instruction from the user" is performed by a method such as an operation using a button on the display monitor 115 (see FIG. 11, for example), an operation using a touch panel, or another method using a speech recognition device or a remote controller, such that one skilled in the art can easily carry it out based on a common-sense technique of this field.

On the other hand, if the vehicle is not stopped in step S40 (NO in step S40), and a playback instruction is not issued by the user in step S43 within a predetermined time period after reception of the video playback request signal is notified (FIG. 3) (NO in step S43), the CPU 111 sends back a video playback request OK response signal to the network camera 211 via the communication terminal 12 and the communication control section 112 (step S44). Next, when the video data transmitted from the network camera 211 is received by the communication terminal 12 and the communication control section 112, the CPU 111 stores the received data in the memory 113 without displaying it on the monitor 115 (step S45).

Alternatively, in step S45, the CPU 111 may cause the display monitor 115 to display a video image of the received video data as a still image, not as a moving image. When the still image is displayed, the CPU 111 may perform a display (e.g., a text message on the display monitor 115), or produce a sound so as to urge the user to stop the vehicle. Also, in the case where the on-vehicle camera image playback device 11 is integrated with a car navigation function, the CPU 111 may obtain route information and a type of a road (an expressway, a general road, and a narrow street, etc.) on which the vehicle is traveling, for example, from the Internet network or an external recording medium such as a DVD-ROM, and give specific instructions to the user where to stop the vehicle (for example, in the case where the user is traveling on an expressway, the CPU 111 may display a message saying "EMERGENCY AT HOME. STOP VEHICLE AT NEXT REST AREA ○○, AND CHECK VIDEO IMAGE" on the display monitor 115). With the above-described structure, in the case where an emergency occurs in the house while the user is driving the vehicle, the on-vehicle camera image playback device 11 notifies the user of the emergency by a still image, not a moving image. Thus, the user is not required to fix his/her eyes on the display monitor 115 for a long time, whereby it is possible to operate the on-vehicle camera image playback device 11 more safely. Also, after reception of video data, the received video data is stored in a memory, whereby the user is allowed to check the content of the video data later when the vehicle is stopped.

Second Embodiment

Figure 5:
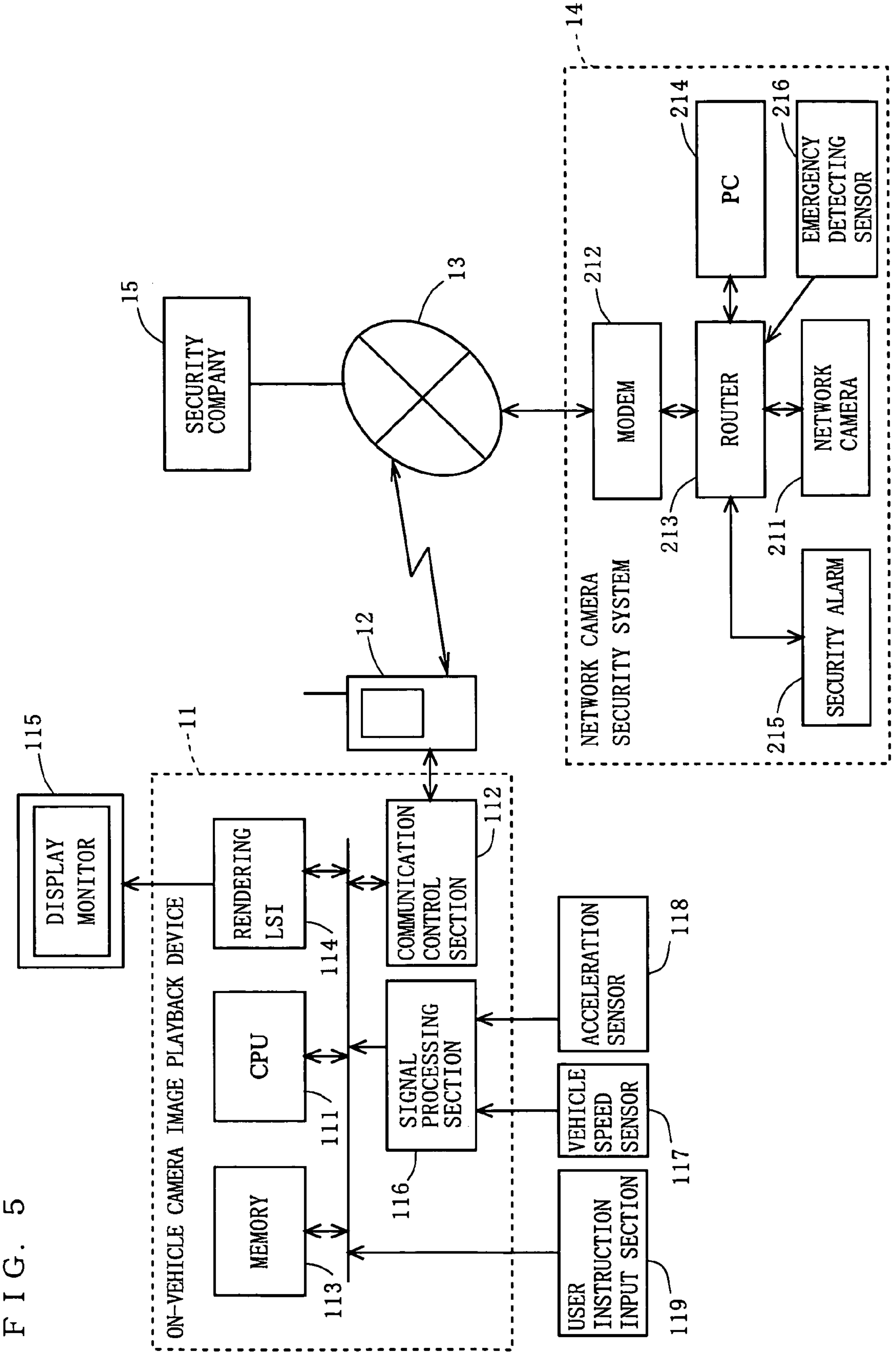
FIG. 5 is a block diagram showing an on-vehicle network camera image playback system including the on-vehicle camera image playback device 11 and the network camera security system 14 according to a second embodiment of the present invention.

FIG. 5 is a block diagram showing an on-vehicle network camera image playback system including the on-vehicle camera image playback device 11 and the network camera security system 14 according to a second embodiment of the present invention. The elements shown in FIG. 5 are the same as those shown in FIG. 1. Therefore, the elements of FIG. 5 will be denoted by the same reference numerals as those used in FIG. 1.

However, the system shown in FIG. 5 differs from the system shown in FIG. 1 as follows. In the system shown in FIG. 1, the emergency detecting sensor 216 is connected to the network camera 211, and an emergency detection signal from the emergency detecting sensor 216 is transmitted to the network camera 211. However, in the system shown in FIG. 5, the emergency detecting sensor 216 is directly connected to the router 213, not via the network camera 211, and is connected to the Internet network 13 via the router 213 and the modem 212. As a result, in the system shown in FIG. 5, an emergency detection signal from the emergency detecting sensor 216 is received by the on-vehicle camera image playback device 11, not by the network camera 211.

Figure 6:
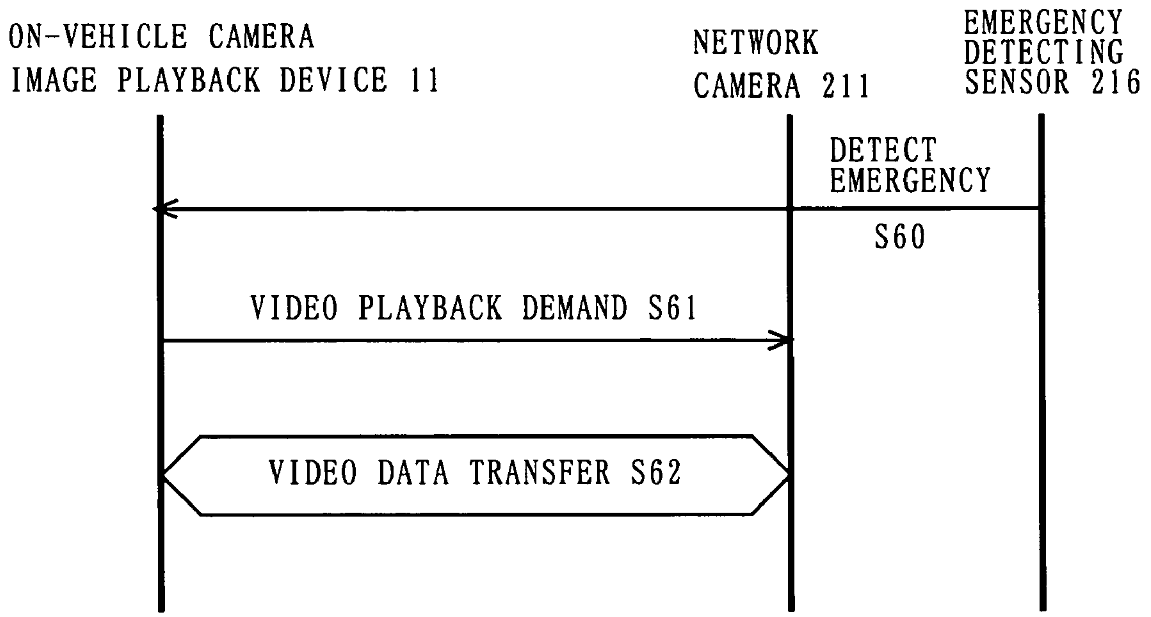
FIG. 6 is a sequence diagram showing a flow of a control signal and video data, which are transmitted and received between the on-vehicle camera image playback device 11, the network camera 211, and the emergency detecting sensor 216 shown in FIG. 5.

FIG. 6 is a sequence diagram showing a flow of a control signal and video data, which are transmitted and received between the on-vehicle camera image playback device 11, the network camera 211, and the emergency detecting sensor 216. As shown in FIG. 6, when an emergency (or a call) is detected, the emergency detecting sensor 216 transmits an emergency (or call) detection signal to the on-vehicle camera image playback device 11 (step S60). When the emergency (or call) detection signal is received, the on-vehicle camera image playback device 11 transmits a video playback demand signal to the network camera 211 based on whether or not the vehicle is stopped and on the presence or absence of a playback instruction from the user (step S61). When the signal is received, the network camera 211 transmits video data to the on-vehicle camera image playback device 11 (step S62). A video image of the video data is displayed on the display monitor 115 of the on-vehicle camera image playback device 11, whereby the user can view what is going on in the house by a video image (a moving image).

Figure 7:
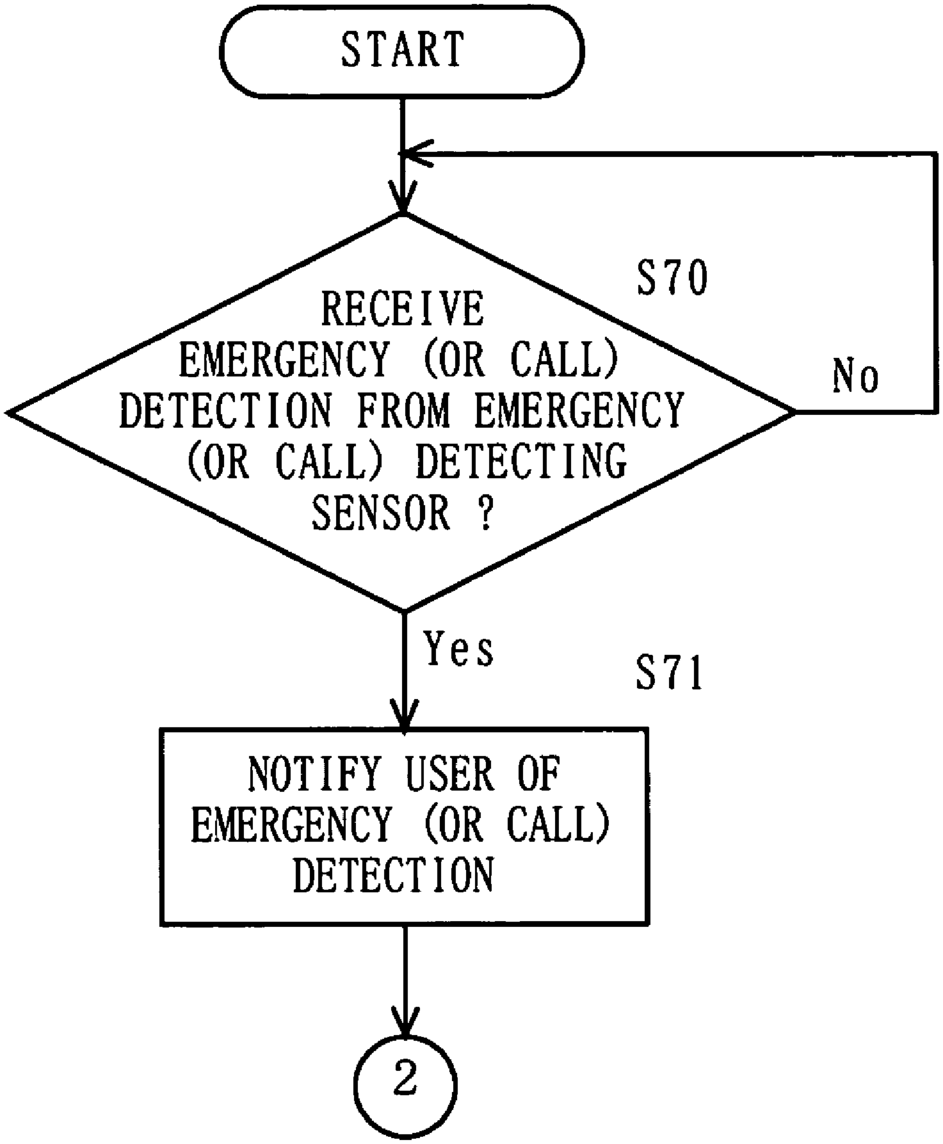
FIG. 7 is a flow diagram showing a process performed by the CPU 111 of the on-vehicle camera image playback device 11 for notifying the user of an emergency (or a call) in the embodiment of the present invention shown in FIGS. 5 and 6.

FIG. 7 is a flow diagram showing a process performed by the CPU 111 of the on-vehicle camera image playback device 11 for notifying the user of an emergency (or a call) in the embodiment of the present invention shown in FIGS. 5 and 6. Hereinafter, with reference to FIG. 7, the process performed by the CPU 111 will be described.

First, the CPU 111 determines whether or not the on-vehicle camera image playback device 11 receives an emergency (or call) detection signal from the emergency (or call) detecting sensor 216 via the communication terminal 12 and the communication control section 112 (step S70). If an emergency (or call) detection signal is not received (NO in step S70), the CPU 111 repeats a process in step S70. If an emergency (or call) detection signal is received (YES in step S70), the CPU 111 notifies the user of emergency (or call) detection (step S71). Here, as is the case with FIG. 3, reception notification for the user in step S71 is performed, for example, by giving the user the following warnings: a text message on a display panel, the blinking of a flashing button (see FIG. 11, for example), a sound, vibration, or any combination thereof, such that the user can notice the notification from the CPU 111 using his/her five senses.

Figure 8:
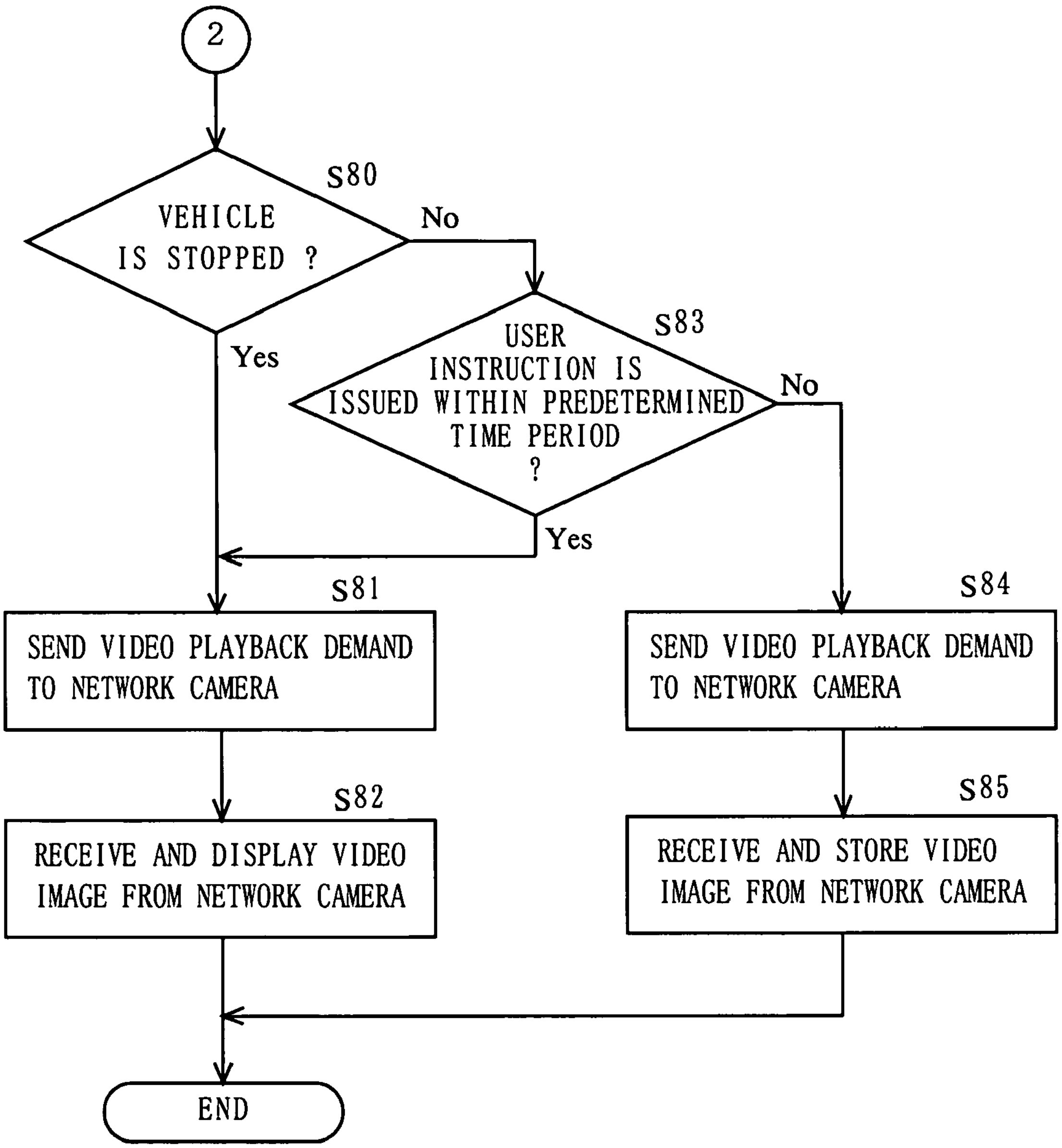
FIG. 8 is a flow diagram showing a camera image playback control process performed by the CPU 111 of the on-vehicle camera image playback device 11 in the embodiment of the present invention shown in FIGS. 6 and 7.

After notifying the user of emergency (or call) detection, the CPU proceeds to a camera image playback control process. FIG. 8 is a flow diagram showing the camera image playback control process performed by the CPU 111 of the on-vehicle camera image playback device 11 in the embodiment of the present invention shown in FIGS. 6 and 7.

Hereinafter, with reference to FIG. 8, the camera image playback control process of the CPU 111 will be described.

The CPU 111 first notifies the user of reception (FIG. 7), and determines whether or not the vehicle is stopped based on a signal output from the signal processing section 116 (step S80). If the vehicle is stopped (YES in step S80), the CPU 111 sends back a video playback demand signal to the network camera 211 via the communication terminal 12 and the communication control section 112 (step S81). Next, when the on-vehicle camera image playback device 11 receives video data from the network camera 211 via the communication terminal 12 and the communication control section 112, the CPU 111 causes the display monitor 115 to display a video image of the received video data (step S82). Note that the CPU 111 may store the video data received by the communication terminal 12 and the communication control section 112 in the memory 113 when or after a video image of the received video data is displayed on the display monitor 115 (not shown in FIG. 8).

On the other hand, if the vehicle is not stopped in step S80 (NO in step S80), the CPU 111 determines in step S83 whether or not a playback instruction is issued by the user within a predetermined time period after reception of the emergency detection signal is notified (FIG. 7). If the playback instruction is issued within a predetermined time period (YES in step S83), the CPU 111 transmits a video playback demand signal to the network camera 211 (step S81). Next, when video data transmitted from the network camera 211 is received by the communication terminal 12 and the communication control section 112, the CPU 111 causes the display monitor 115 to display a video image of the received video data (step S82). On the other hand, if the playback instruction is not issued by the user within a predetermined time period after reception of the emergency detection signal is notified (FIG. 7) (NO in step S83), the CPU 111 transmits a video playback demand signal to the network camera via the communication terminal 12 and the communication control section 112 (step S84), and receives the video data transmitted from the network camera 211. Then, the CPU 111 stores the received video data in the memory 113 without displaying it on the display monitor 115 (step S85).

Alternatively, as described in FIG. 4, the CPU 111 may cause the display monitor 115 to display a video image of the received video data as a still image, not as a moving image, in step S85. When the still image is displayed, the CPU 111 may perform a display (e.g., a text message on the display monitor 115), or produce a sound so as to urge the user to stop the vehicle. Also, in the case where the on-vehicle camera image playback device 11 is integrated with a car navigation function, the CPU 111 may obtain route information and a type of a road (an expressway, a general road, and a narrow street, etc.) on which the vehicle is traveling, for example, from the Internet network or an external recording medium such as a DVD-ROM, and give specific instructions to the user where to stop the vehicle (for example, in the case where the user is traveling on an expressway, the CPU 111 may display a message saying "EMERGENCY AT HOME. STOP VEHICLE AT NEXT REST AREA ○○, AND CHECK VIDEO IMAGE" on the display monitor 115). With the above-described structure, in the case where an emergency occurs in a house while the user is driving the vehicle, the on-vehicle camera image playback device 11 notifies the user of the emergency by a still image, not a moving image. Thus, the user is not required to fix his/her eyes on the display monitor 115 for a long time, whereby it is possible to operate the on-vehicle camera image playback device 11 more safely. Also, after reception of video data, the received video data is stored in a memory, whereby the user is allowed to check the content of the video data later when the vehicle is stopped.

Figure 9:
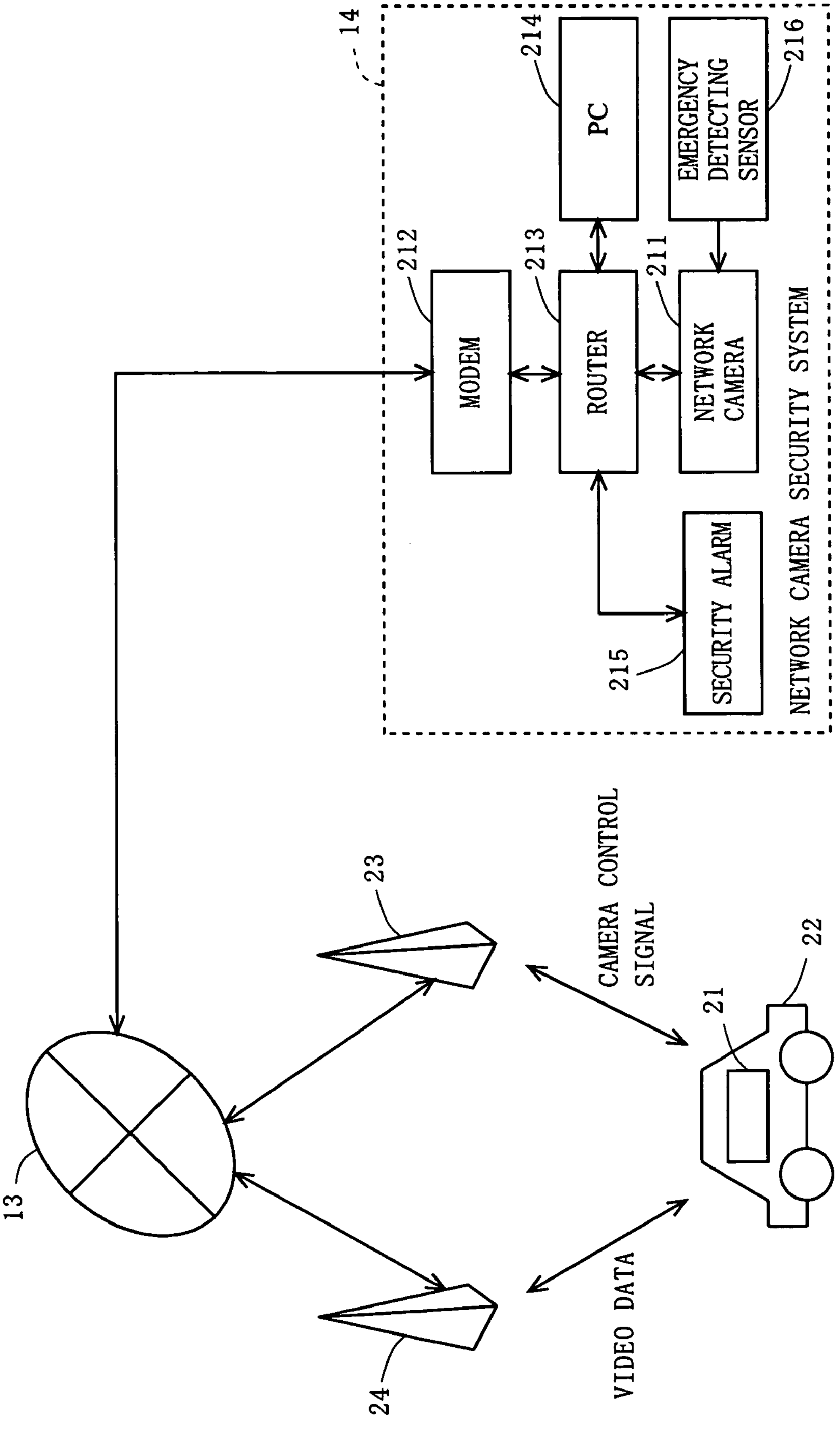
FIG. 9 is a block diagram showing an exemplary variant of the embodiment shown in FIG. 1 or 5, in which a communication terminal includes a mobile phone terminal and a wireless LAN transmitting/receiving section.

FIG. 9 shows an exemplary variant of the embodiment shown in FIG. 1 or 5, in which the communication terminal 12 shown in FIG. 1 or 5 includes a mobile phone terminal and a wireless LAN transmitting/receiving section. In FIG. 9, the mobile phone terminal and the wireless LAN transmitting/receiving section are connected to an on-vehicle camera image playback device 21 mounted on a vehicle 22 (not shown).

In the variant shown in FIG. 9, a communication path of the mobile phone is used for transmission/reception of a camera control signal (including the video playback request signal, the video playback request OK response signal, the emergency (or call) detection signal, and the video playback demand signal), and a high-speed communication path of the wireless LAN is used for transmission/reception of video data from the network camera. The on-vehicle camera image playback device 21 is connected to a base station of the mobile phone 23 and a wireless LAN access point 24 via the mobile phone terminal and the wireless LAN transmitting/receiving section. The wireless LAN transmitting/receiving section of the on-vehicle camera image playback device 21 performs communication with the wireless LAN access point 24 using a communication protocol such as IEEE 802.11a/b/g.

An advantage of the embodiment shown in FIG. 9 will be described in detail. In the case where the user desires to view a high quality image of video data, which is transmitted from the network camera 211, in the vehicle, a communication band of the video data is restricted due to large volumes of video data and a limited communication speed of the mobile phone (for example, 144 kbps or 384 kbps). Also, in the case where the on-vehicle camera image playback device 21 includes other application having a function other than a function of viewing a video image transmitted from a network camera, and other communication (e.g., downloading of multimedia contents such as music, downloading of cartographic update data, or transmission of probe information) other than transmission/reception of camera image data and a camera control signal is performed between the vehicle and an external Internet network, it is preferable, for the sake of convenience, to minimize the effect of the communication between the network camera and the vehicle on the other communication.

Thus, as shown in FIG. 9, the on-vehicle camera image playback device 21 transmits and receives a camera control signal (for example, the video playback request signal, the video playback request OK response signal, the emergency (or call) detection signal, and the video playback demand signal) using the mobile phone terminal, irrespective of the presence or absence of an accessible wireless LAN access point near the vehicle, and receives video data using the wireless LAN transmitting/receiving section. When the on-vehicle camera image playback device 21 receives a video image, and determines to display the received video image, the on-vehicle camera image playback device 21 checks whether or not there is an accessible wireless LAN access point near the vehicle immediately before step S42 (or step S45, S82, and S85), for example. If there is an accessible wireless LAN access point near the vehicle, the on-vehicle camera image playback device 21 receives the video data using the wireless LAN, and displays a video image of the received video data (not shown). As a result, in the case where there is a wireless LAN access point near the vehicle, it is possible to allow the user to view a high quality image of video data without restricting a communication band needed for other communication. Here, the communication control section 112 may determine whether to use the mobile phone terminal or the wireless LAN transmitting/receiving section. Note that the mobile phone terminal may be replaced with a PDA and a PHS terminal, for example. Also, the wireless LAN may be replaced with DSRC (Dedicated Short Range Communication), an infrared ray, and UWB (Ultra Wide Band), or another wireless communication system such as a wireless communication system using satellite communication. Also, in FIG. 9, it is assumed that the structure of the network camera security system 14 is the same as the structure shown in FIG. 1, but it may be the same as the structure shown in FIG. 5.

Further, in each embodiment of the present invention, it will be understood by the person in the art that numerous other modifications can be made to the on-vehicle camera image playback device by replacement, addition, and/or deletion of each element.

Figure 10:
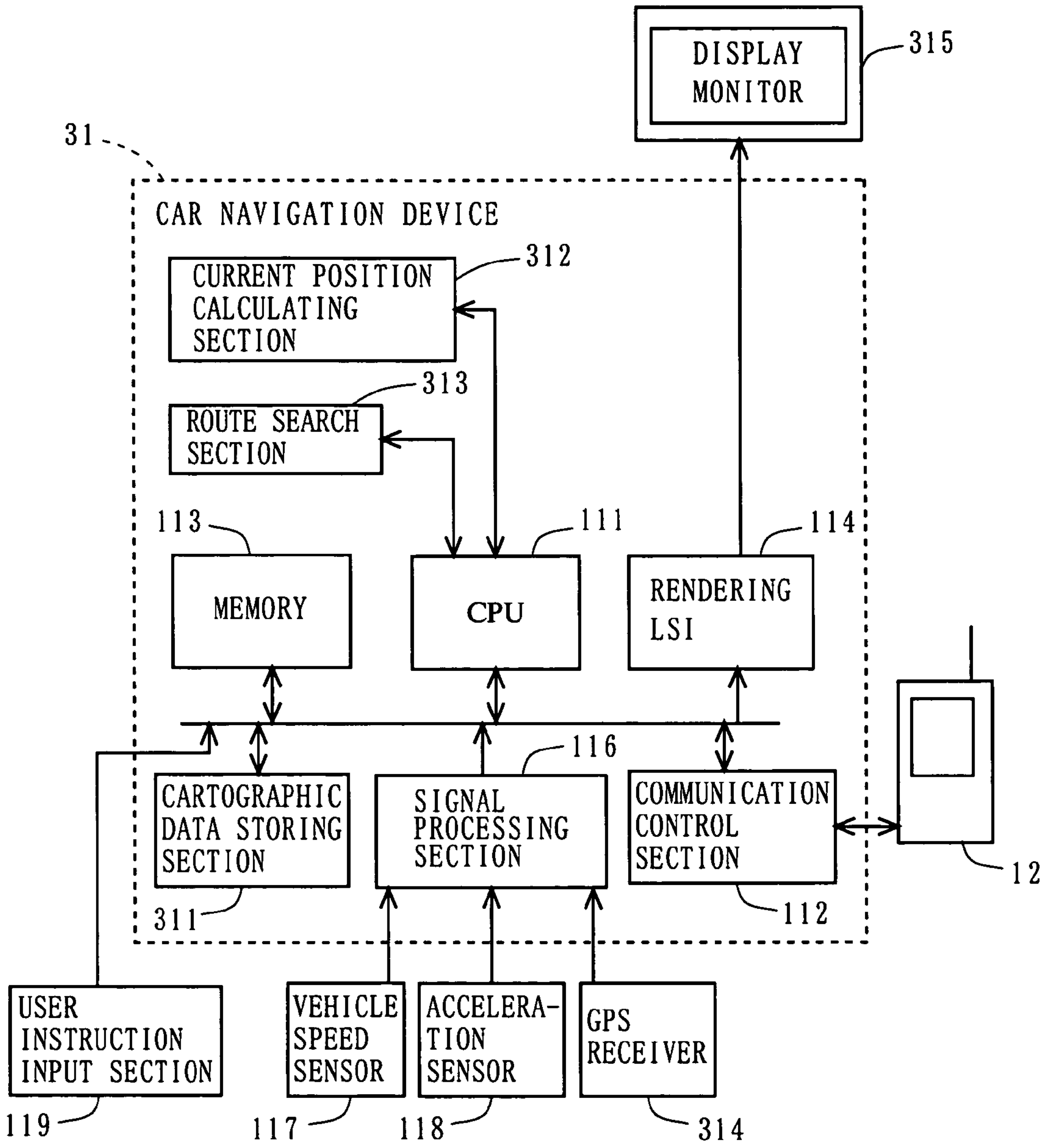
FIG. 10 is a block diagram showing an on-vehicle camera image playback device 31 integrated with a car navigation function, which is still another variant of the embodiment of the present invention.

FIG. 10 shows still another variant of the embodiment of the present invention, that is, an on-vehicle camera image playback device 31 integrated with a car navigation function (hereinafter, referred to as a car navigation device 31). The car navigation device 31 has the on-vehicle camera image playback device 11 shown in FIG. 1 or 5, in which a GPS receiver 314, a current position calculating section 312, a route search section 313, and a cartographic data storing section 311 are newly included. Note that, in FIG. 10, the communication terminal 12, the display monitor 315, the vehicle speed sensor 117, the acceleration sensor 118, the user instruction input section 119, and the GPS receiver 314 are shown as external elements attached to the on-vehicle camera image playback device 11. However, the above-described elements may be built into the on-vehicle camera image playback device 11.

In FIG. 10, the GPS receiver 314 receives electric waves from a plurality of a GPS (Global Positioning System) satellites, outputs a current position of the vehicle on which it is mounted as latitude, longitude, and altitude information, and outputs speed as speed information to the signal processing section 116. The current position calculating section 312 connected to the CPU calculates a current position based on a current position signal from the GPS receiver 314, and the route search section 313 searches a optimal route to a destination point and an intermediate point input by the user, based on the calculated current position and the cartographic data from the cartographic data storing section 311. These processes are realized by a computer program. The cartographic data storing section 311 is a storage device in which cartographic data is stored, such as an HDD, a DVD-ROM, a CD-ROM, and other semiconductor memory for storing cartographic data. The cartographic data storing section 311 is appropriately read and used by the route search section 313. Note that a portion or the entirety of the cartographic data may be obtained from an external service center via the communication terminal 12 and the communication control section 112.

The display monitor 315 of FIG. 10 has not only a function of playing back/displaying a video image, which is a basic function and structure of the display monitor 115 of FIGS. 1 and 5, but also a function of displaying a map for navigation. In addition, in the case where a TV tuner (not shown) is connected to the car navigation device 31, the display monitor 315 of FIG. 10 has a function of displaying TV images.

Figure 11:
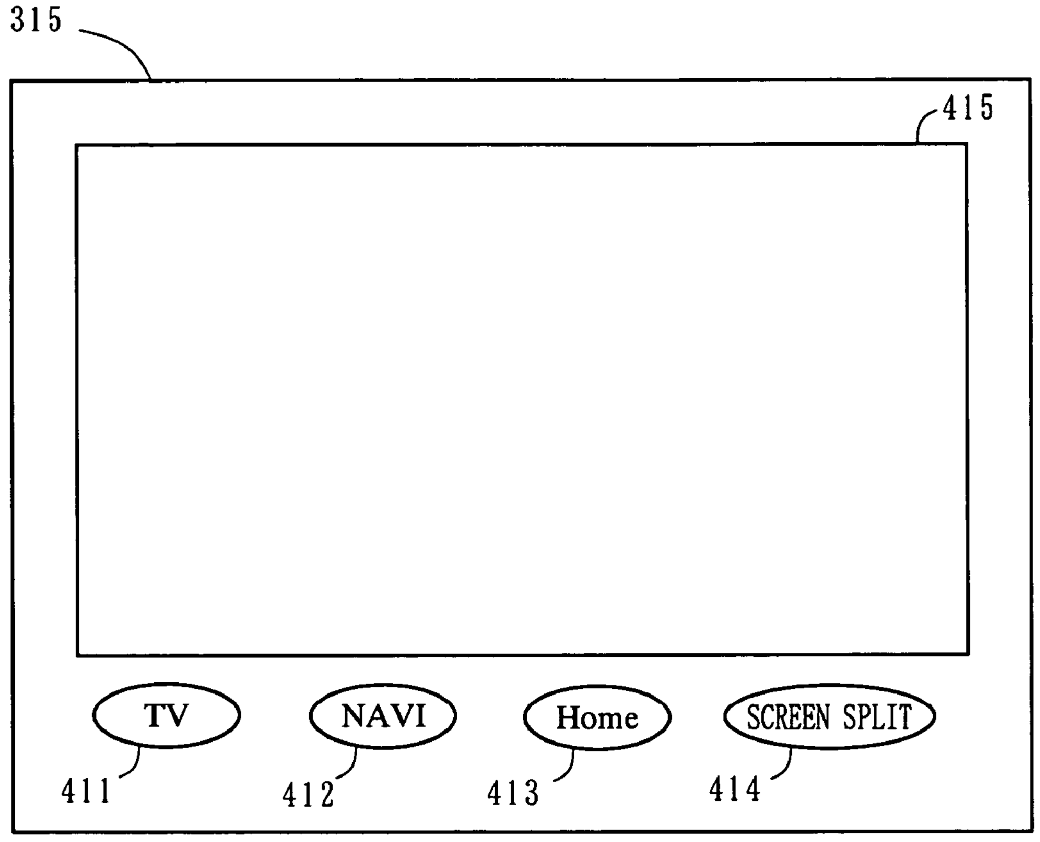
FIG. 11 is a schematic diagram showing a display monitor 315 provided for the car navigation device 31 shown in FIG. 10.

With reference to FIG. 11, one example of the display monitor 315 provided for the car navigation device 31 shown in FIG. 10 will be described. In FIG. 8, the display monitor 315 is, for example, placed on the dashboard near the driver. The display monitor 315 includes a "TV" function button 411 for causing a TV image to be displayed, a "NAVI" function button 412 for causing a map to be displayed for navigation, a "HOME" function button 413 for causing a video image from the network camera placed inside a house (home), etc. to be displayed, a "screen split" function button 414 for splitting a screen (for example, a map display on the left, and a video image on the right), and a liquid crystal display section 415. Switching from one function to another can be performed by operating, for example, a function button on which "TV" or "NAVI" is written (in FIG. 9, reference numerals 411 and 412 are used to denote the "TV" function button and the "NAVI" function button, respectively). In the case where the above-described display monitor 315 is used, reception notification for the user in step S30 (FIG. 3) and step S70 (FIG. 7) can be performed, for example, by causing the "HOME" function button 413 on the display monitor 315 to blink, or by causing the "HOME" function button 413 to blink and producing a sound as a warning. Further, the user's playback instruction in step S43 (FIG. 4) and step S83 (FIG. 8) can be performed by the user, for example, by depressing (or touching) the "HOME" function button 413 with a finger, etc. Thus, the user can issue an instruction to play back the video image showing what is going on in the house as easily as he/she changes the screen to a TV or a map display.

Further, the display monitor 315 may be a touch panel display, whereby the camera orientation control, which has been briefly described with reference to FIG. 1, is performed in accordance with a touch signal. Thus, the user can freely and easily change the orientation of the camera only by touching the touch panel.

Figure 12:
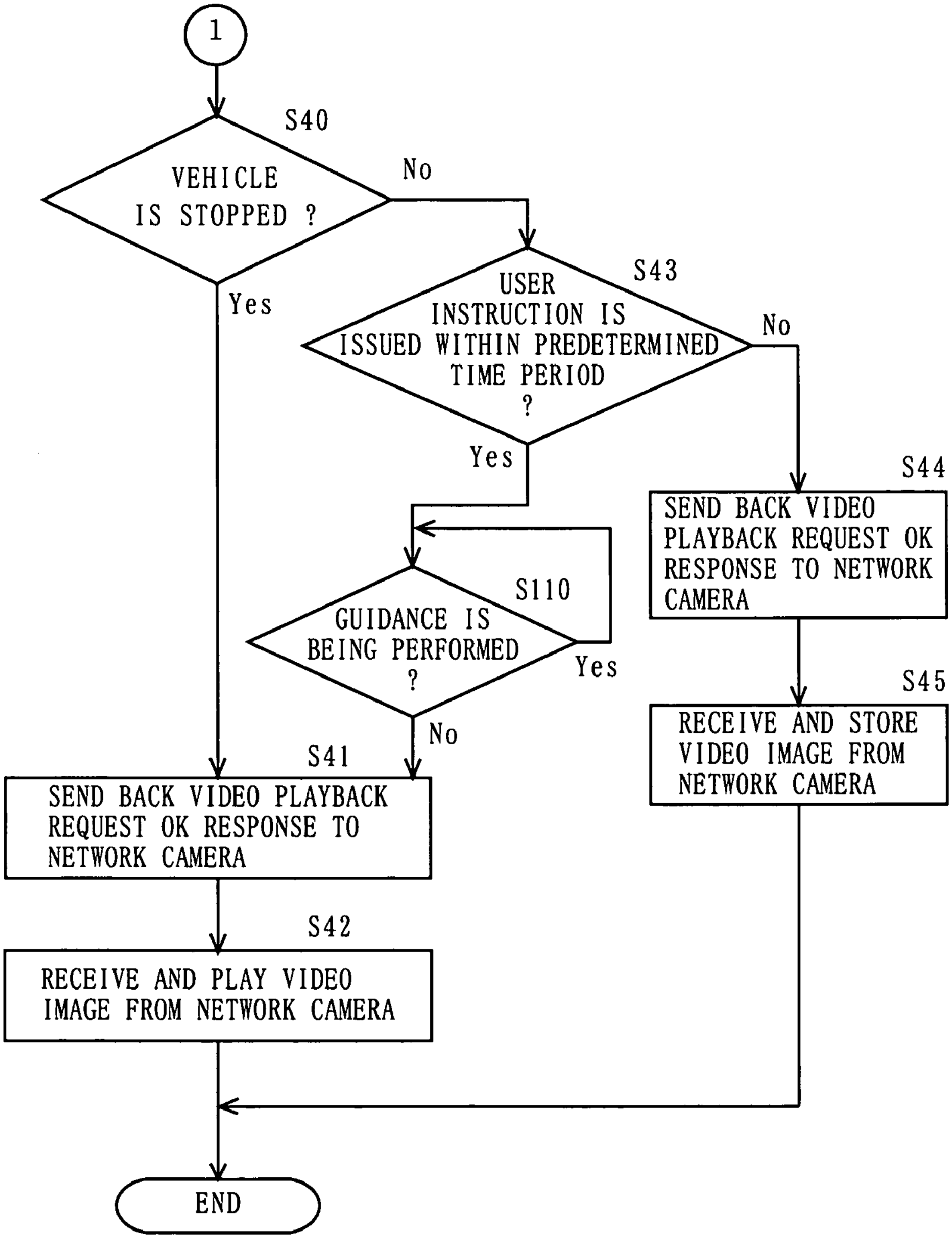
FIG. 12 is a variant of the camera image playback control process shown in FIG. 4, illustrating a flow diagram showing a camera image playback control process performed by the CPU 111 of the car navigation device 31 shown in FIG. 10.

FIG. 12 is a variant of the camera image playback control process shown in FIG. 4, illustrating a flow diagram showing a camera image playback control process performed by the CPU 111 of the car navigation device 31 shown in FIG.

Figure 13:
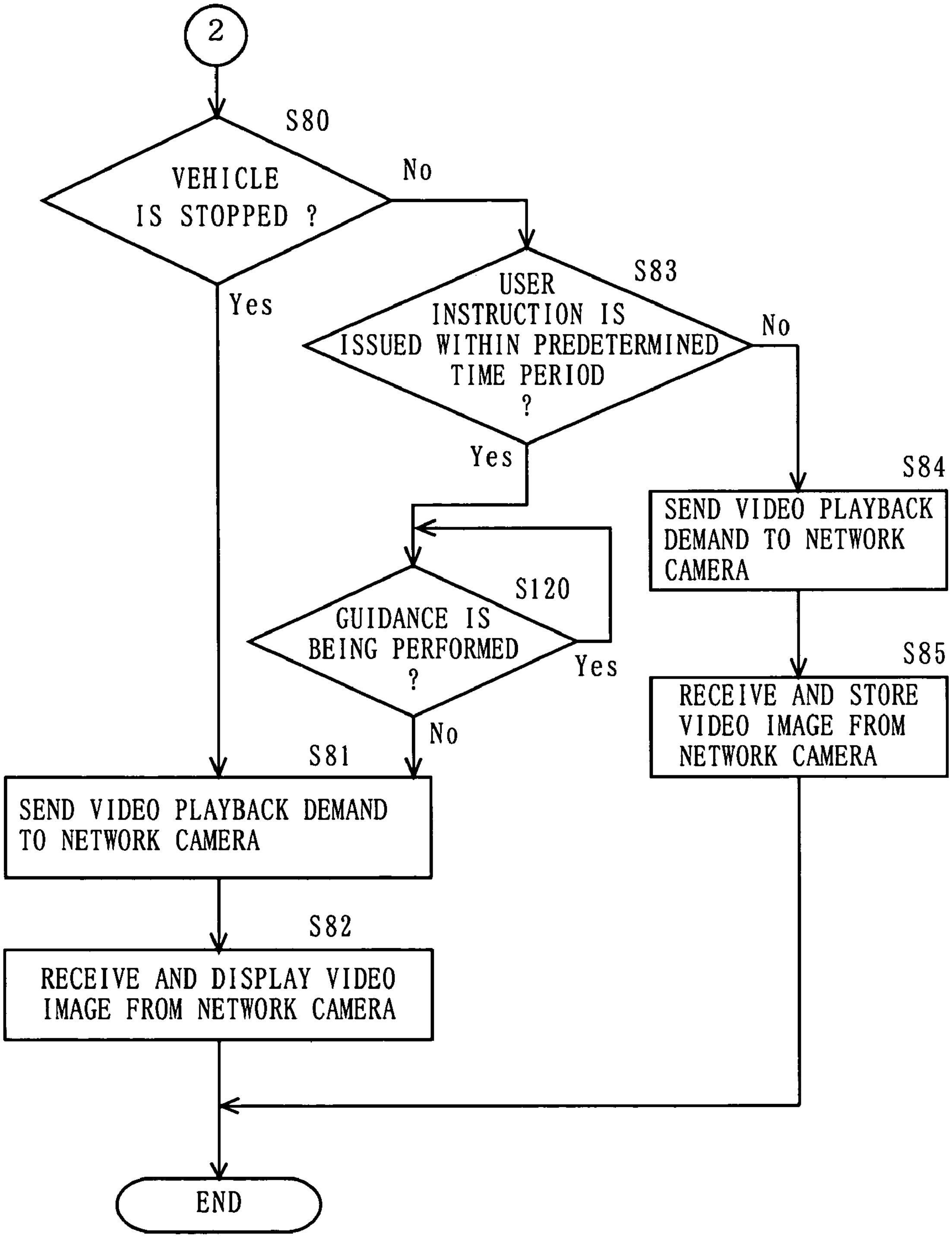
FIG. 13 is a variant of the camera image playback control process shown in FIG. 8, illustrating a flow diagram showing a camera image playback control process performed by the CPU 111 of the car navigation device 31 shown in FIG. 10.
Figure 14:
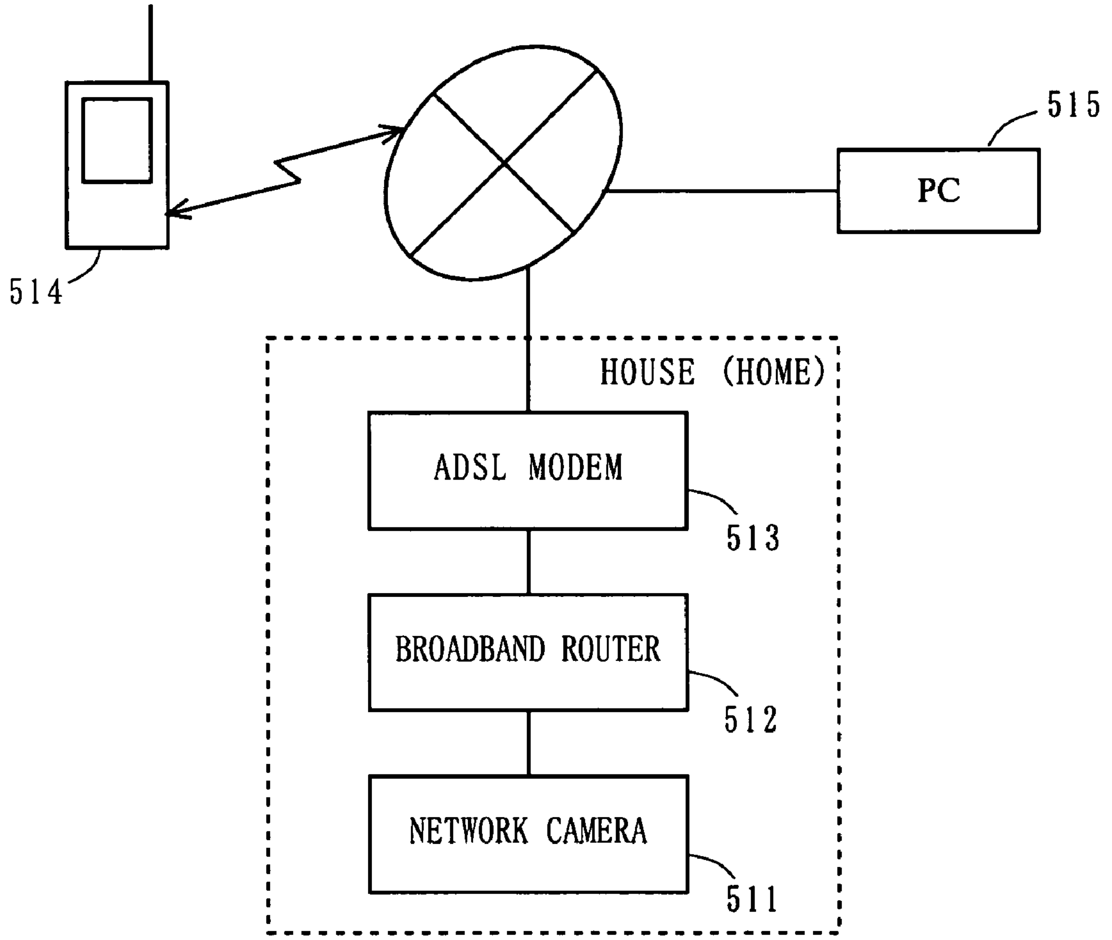
FIG. 14 PRIOR ART
FIG. 14 is a block diagram showing a conventional technique in which a network camera 511 placed in a house (home) in a broadband environment such as ADSL is connected to an Internet network via an ADSL modem 513 and a broadband router 512.
Figure 15:
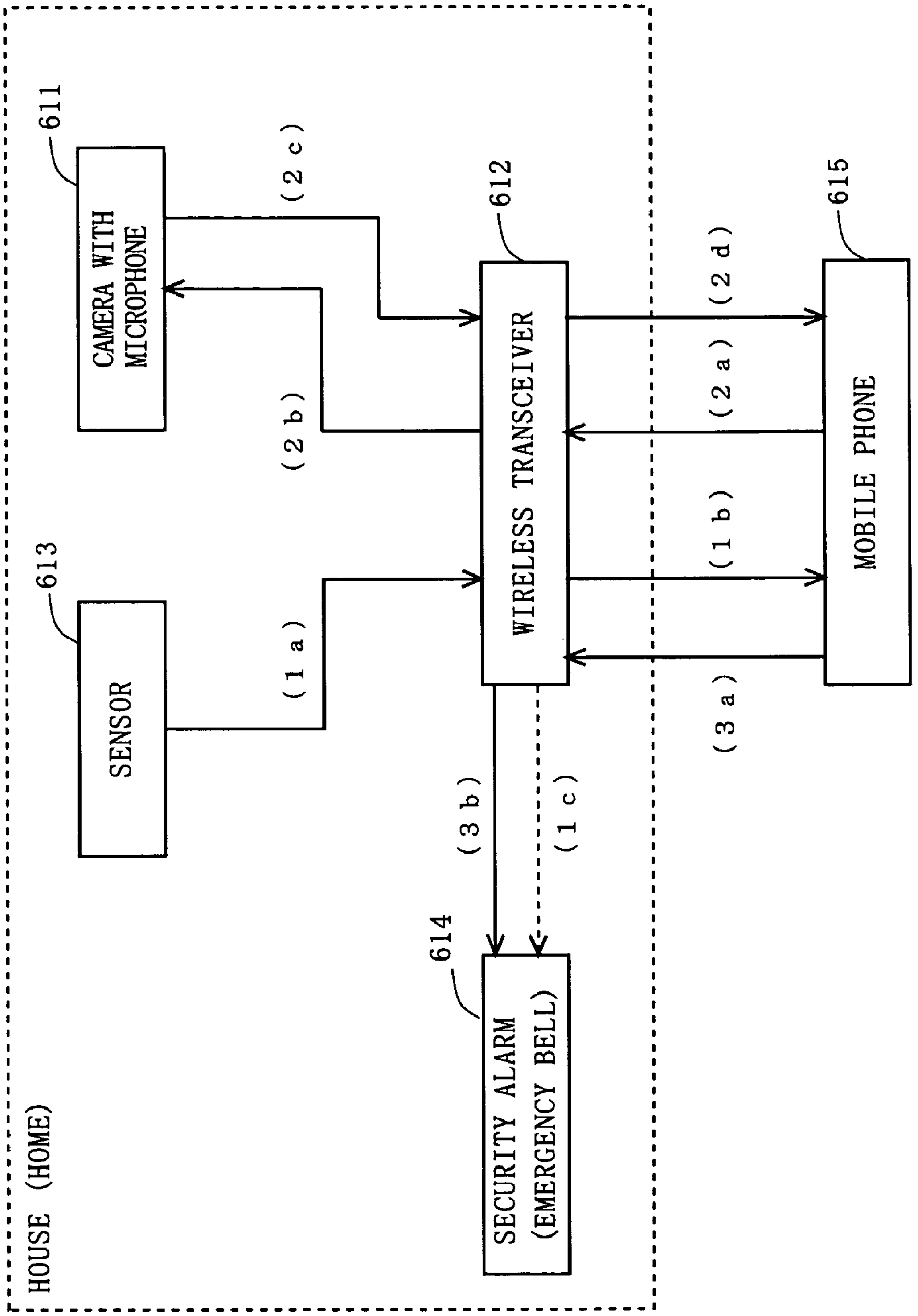
FIG. 15 PRIOR ART
FIG. 15 is a block diagram showing a portable security system disclosed in Japanese Patent Laid-Open Publication No. 2000-36088 in which a network camera is integrated with a sensor for detecting an emergency such as a break-in, fire, or gas leak.
Figure 16:
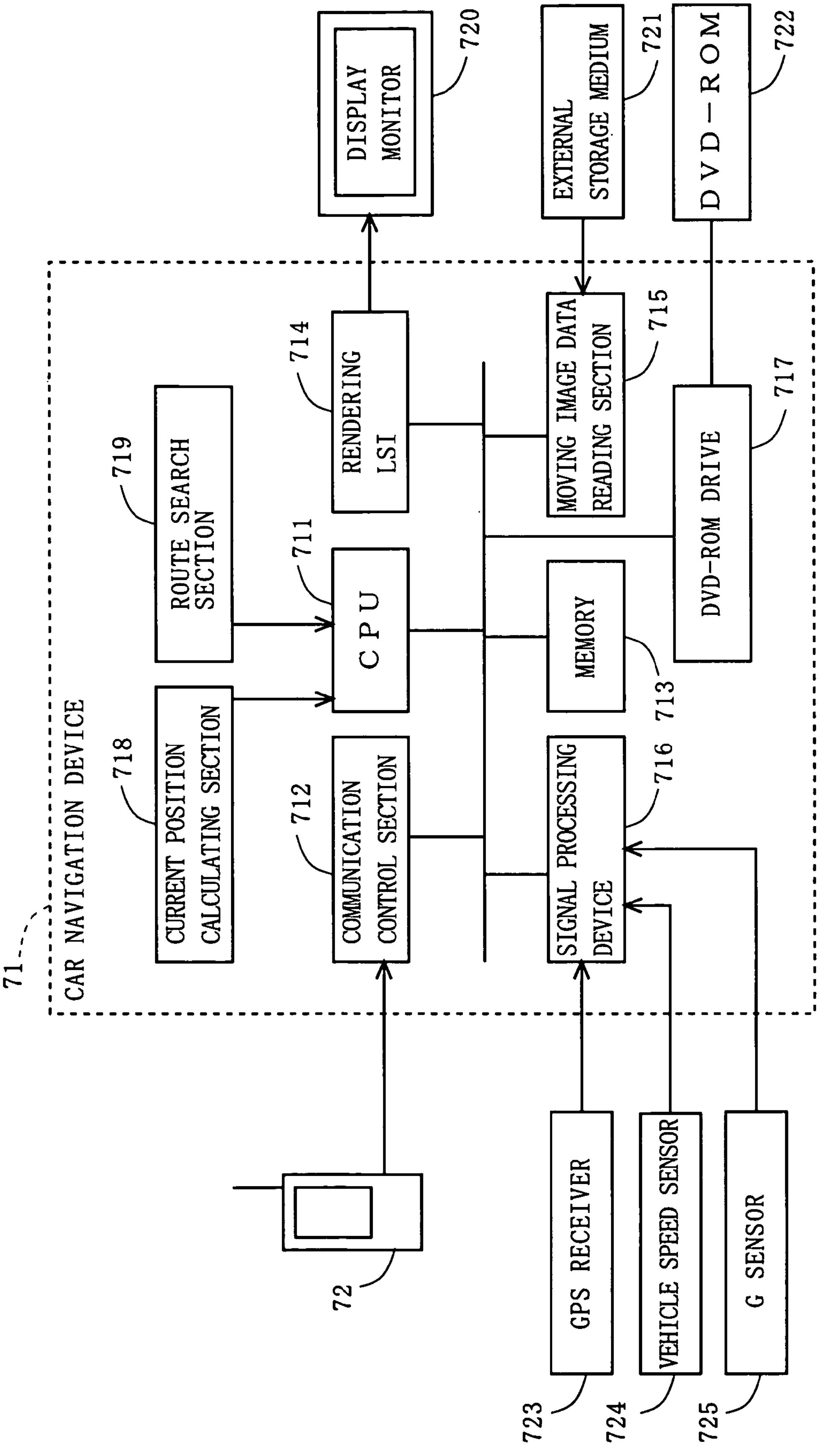
FIG. 16 PRIOR ART
FIG. 16 is a block diagram showing a car navigation device 71 capable of storing and playing back a video mail, which is disclosed in Japanese Patent Laid-Open Publication No. 2002-107158.

10. FIG. 13 is a variant of the camera image playback control process shown in FIG. 8, illustrating a flow diagram showing a camera image playback control process performed by the CPU 111 of the car navigation device 31 shown in FIG. 10.

FIG. 12 shows a flow diagram shown in FIG. 4 to which step S110 is newly added, and FIG. 13 shows a flow diagram shown in FIG. 8 to which step S120 is newly added. In steps S110 and S120, determination is made whether or not guidance is being performed. Here, assume that guidance corresponds to a navigation function for notifying the user of a route using a sound or a character and a symbol appearing on the screen such that the user hears or sees a message "TURN TO THE RIGHT" when he/she should turn to the right, for example, at an intersection, etc. If guidance is being performed (YES in step S110 and step S120), the CPU 111 waits for the guidance to be over. When the guidance is over, (NO in step S110 and step S120), the CPU 111 proceeds to step S41 and S81. As a result, it is possible to control playback of a video image so as not to be performed during the guidance. For example, a video image is not displayed while the car navigation device is performing guidance so that the user turns to the right at an intersection, whereas a video image is displayed when the user starts traveling on the road. However, the present invention is not limited thereto. For example, as mentioned above, the screen may be split (for example, a map display on the left, and a camera image on the right) during the guidance, or a map display and a camera image may be alternately displayed on the screen. Also, the user may previously perform settings so that the car navigation device 31 preferentially carries out guidance for car navigation or playback of a camera image.

While the invention has been described in detail, the foregoing description is in all aspects illustrative and not restrictive. It is understood that numerous other modifications and variations can be devised without departing from the scope of the invention.

What is claimed is:

1. An on-vehicle device for placement in a vehicle and connection to an external image taking device via the Internet such that the on-vehicle device is able to communicate with the image taking device via the Internet, the external image taking device for detecting an emergency at least within an area in which an image is captured or a call, and transmitting an emergency detection notification or a call detection notification to a previously designated destination when the emergency or the call is detected, respectively, the on-vehicle device comprising:

communication means for communicating with the image taking device via the Internet;

reception notification means for notifying a user, by at least one of blinking of a button, a sound, vibration, and displaying a character or a symbol on a display panel, that the communication means receives an emergency detection notification or a call detection notification from the image taking device;

display means for displaying a video image of video data received by the communication means from the image taking device;

vehicle stopped state detection means for detecting whether or not the vehicle is stopped;

control means for checking the vehicle stopped state detection means to determine whether or not the vehicle is stopped when the communication means receives the emergency detection notification or the call detection notification from the image taking device, receiving the video data from the image taking device via the communication means and causing the display means to display the video image of the video data if the vehicle is stopped, and notifying the user of the emergency detection notification or the call detection notification by the reception notification means if the vehicle is not stopped; and a video image playback instruction input means for accepting an input of a video image playback instruction from the user, wherein if the vehicle is not stopped, the control means is operable to receive the video data from the image taking device via the communication means at least when the video image playback instruction input means receives the video image playback instruction, and cause the display means to display the video image of the video data.

2. An on-vehicle device for placement in a vehicle and connection to an external image taking device via the Internet such that the on-vehicle device is able to communicate with the image taking device via the Internet, the external image taking device for detecting an emergency at least within an area in which an image is captured or a call, and transmitting an emergency detection notification or a call detection notification to a previously designated destination when the emergency or the call is detected, respectively, the on-vehicle device comprising:

communication means for communicating with the image taking device via the Internet;

reception notification means for notifying a user that the communication means receives an emergency detection notification or a call detection notification from the image taking device;

display means for displaying a video image of video data received by the communication means from the image taking device;

vehicle stopped state detection means for detecting whether or not the vehicle is stopped;

control means for checking the vehicle stopped state detection means to determine whether or not the vehicle is stopped when the communication means receives the emergency detection notification or the call detection notification from the image taking device, receiving the video data from the image taking device via the communication means and causing the display means to display the video image of the video data if the vehicle is stopped, and notifying the user of the emergency detection notification or the call detection notification by the reception notification means if the vehicle is not stopped; and a video image playback instruction input means for accepting an input of a video image playback instruction from the user, wherein if the vehicle is not stopped, the control means is operable to receive the video data from the image taking device via the communication means at least when the video image playback instruction input means receives the video image playback instruction, and cause the display means to display the video image of the video data.

3. The on-vehicle device according to claim 2, wherein when an emergency or a call is detected, the image taking device transmits a video image playback request signal as the emergency detection notification or the call detection notification, and the control means is operable to perform a display control operation when the communication means receives the video image playback request signal transmitted from the image taking device.

4. The on-vehicle device according to claim 2, wherein when an emergency or a call is detected, the image taking device transmits an emergency detection signal or a call detection signal as the emergency detection notification or the call detection notification, respectively, and the control means is operable to perform a display control operation when the communication means receives the emergency detection signal or the call detection signal from the image taking device.

5. The on-vehicle device according to claim 2, wherein if the vehicle is not stopped and the video image playback instruction input means receives the video image playback instruction within a predetermined time period after the reception notification means notifies the user of reception notification, the control means is operable to receive the video data from the image taking device via the communication means, and cause the display means to display the video image of the video data.

6. The on-vehicle device according to claim 5, further comprising video data storing means for storing the video data received by the communication means from the image taking device, wherein if the vehicle is not stopped and the video image playback instruction input means does not receive the video image playback instruction within a predetermined time period after the reception notification means notifies the user of reception notification, the control means is operable to receive the video data from the image taking device via the communication means, and cause the video data storing means to store the received video data.

7. The on-vehicle device according to claim 6, wherein, when the vehicle is stopped, the control means is operable to read the video data stored in the video data storing means, and display the read data on the display means.

8. The on-vehicle device according to claim 2, wherein the video image playback instruction input means includes at least one of a button, a key, a touch panel, a speech recognition device, and a remote control device.

9. The on-vehicle device according to claim 2, wherein the reception notification means is operable to perform reception notification by blinking a button, and the video image playback instruction input means is operable to accept the video image playback instruction when the blinking button is depressed.

10. The on-vehicle device according to claim 2, wherein the communication means includes a mobile phone terminal and a wireless LAN transmitting/receiving section, and the communication means is operable to use the mobile phone terminal for receiving the emergency detection notification or the call detection notification from the image taking device, and use the wireless LAN transmitting/receiving section for receiving the video data from the image taking device.

11. A remote monitoring system for displaying an image captured by an image taking device on an on-vehicle device, the remote monitoring system comprising:

an on-vehicle device located in a vehicle; and an external image taking device, wherein the image taking device includes:

an emergency or call detecting sensor for detecting an emergency at least within an area in which an image is captured or a call; and transmitting means for transmitting an emergency detection notification or a call detection notification to a previously designated destination via the Internet when the emergency or call detecting sensor detects the emergency or the call, and the on-vehicle device includes:

communication means for performing communication with the image taking device via the Internet;

reception notification means for notifying a user that the communication means receives the emergency detection notification or the call detection notification from the image taking device;

display means for displaying video data received by the communication means from the image taking device;

vehicle stopped state detection means for detecting whether or not the vehicle is stopped;

video image playback instruction input means for accepting an input of a video image playback instruction from the user; and display control means for checking the vehicle stopped state detection means to determine whether or not the vehicle is stopped when the communication means receives the emergency detection notification or the call detection notification from the image taking device, receiving the video data from the image taking device via the communication means and causing the display means to display a video image of the video data if the vehicle is stopped, and receiving the video data from the image taking device via the communication means at least when the video image playback instruction input means receives the video image playback instruction and causing the display means to display the video image of the video data if the vehicle is not stopped.

* * * * *